United States Patent
Mathai et al.

(10) Patent No.: US 9,642,077 B2
(45) Date of Patent: May 2, 2017

(54) NODE SELECTION IN VIRTUAL EVOLVED PACKET CORE

(71) Applicant: Cisco Technology, Inc., San Jose, CA (US)

(72) Inventors: Stinson Mathai, Flower Mound, TX (US); Ravi Guntupalli, Johns Creek, GA (US); Aeneas Dodd-Noble, Andover, MA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 605 days.

(21) Appl. No.: 14/061,233

(22) Filed: Oct. 23, 2013

(65) Prior Publication Data
US 2015/0109995 A1 Apr. 23, 2015

(51) Int. Cl.
*H04W 48/18* (2009.01)
*H04L 29/12* (2006.01)

(52) U.S. Cl.
CPC .......... *H04W 48/18* (2013.01); *H04L 61/301* (2013.01); *H04L 61/305* (2013.01); *H04L 61/1511* (2013.01); *H04L 61/1588* (2013.01); *H04L 61/6054* (2013.01)

(58) Field of Classification Search
CPC ....... H04W 48/20; H04W 8/04; H04W 48/18; H04L 61/305; H04L 61/301; H04L 61/1511; H04L 61/1588; H04L 61/6054
USPC ......................................................... 370/328
See application file for complete search history.

(56) References Cited

U.S. PATENT DOCUMENTS

| 2011/0096750 | A1 | 4/2011 | Velandy et al. |
| 2011/0098050 | A1 | 4/2011 | Eipe et al. |
| 2013/0121207 | A1 | 5/2013 | Parker |
| 2013/0124712 | A1 | 5/2013 | Parker |

(Continued)

FOREIGN PATENT DOCUMENTS

| WO | WO2012/010209 | 1/2012 |
| WO | WO2013/010585 | 1/2013 |

OTHER PUBLICATIONS

EPO Jul. 16, 2015 Search Report and Written Opinion from European Application No. EP14183254.3.

(Continued)

*Primary Examiner* — Kan Yuen
*Assistant Examiner* — Richard Chang
(74) *Attorney, Agent, or Firm* — Patent Capital Group

(57) ABSTRACT

The present disclosure includes gateways and methods for node selection of virtual network nodes in virtual evolved packet core networks. The methods include receiving, at a gateway from an evolved Node B (eNodeB), an attach request for a user equipment (UE), and determining a network selection hint corresponding to the received attach request, where the network selection hint is used for determining a virtual network node for selection in a mobile cloud network. The methods further include determining a domain name for establishing a network connection based at least in part on the network selection hint, where the selected domain name is associated with a virtual network node in the mobile cloud network. The methods also include selecting a virtual network node associated with the determined domain name, and establishing a network session to the selected virtual network node.

22 Claims, 21 Drawing Sheets

(56) References Cited

U.S. PATENT DOCUMENTS

2013/0136032 A1* 5/2013 Meirosu ............... H04W 8/02
370/254

OTHER PUBLICATIONS

ETSI TS-123-401 V.11.7.0 Technical Specification, "LTE; General Packet Radio Service (GPRS) enhancements for Evolved Universal Terrestrial Radio Access Network (E-UTRAN) access (3GPP TS 23.401 version 11.7.0 Release 11)," European Telecommunications Standards Institute (ETSI), 650 Route Des Lucioles; F-06921 Sophia-Antipolis, France, Sep. 2013, 288 pages.

3GPP TS 23.003 V12.0.0 (Sep. 2013), "3rd Generation Partnership Project; Technical Specification Group Core Network and Terminals; Numbering, Addressing and Identification (Release 12)", 84 pages.

3GPP TS 23 401 v12.2.0 (Sep. 2013), "3rd Generation Partnership Project; Technical Specification Group Services and System Aspects; General Packet Radio Service (GPRS) Enhancements for Evolved Universal Terrestrial Radio Access Network (E-UTRAN) Access (Release 12)", 293 pages.

3GPP TS 29.272 v12.2.0 (Sep. 2013), "3rd Generation Partnership Project; Technical Specification Group Core Network and Terminals; Evolved Packet System (EPS); Mobility Management Entity (MME) and Serving GPRS Support Node (SGSN) Related Interfaces Based on Diameter Protocol (Release 12)", 128 pages.

3GPP TS 29.303 v12.1.0 (Sep. 2013), "3rd Generation Partnership Project; Technical Specification Group Core Network and Terminals; Domain Name System Procedures; Stage 3 (Release 12)", 57 pages.

Korhonen, et al., "Diameter Mobile IPv6: Support for Network Access Server to Diameter Server Interaction", Network Working Group, Feb. 2009, 17 pages.

* cited by examiner

NODE SELECTION IN VIRTUAL EVOLVED PACKET CORE

FIELD OF THE DISCLOSURE

The present disclosure relates generally to systems and methods for node selection in a telecommunications network.

BACKGROUND

Wireless networks are telecommunications networks that use radio waves to carry information from one node in the network to one or more receiving nodes in the network. Cellular telephony is characterized by the use of radio cells that provide radio coverage for a regional or geographic area, with multiple cells arranged to provide contiguous radio coverage over a larger regional or geographic area. Wired communication can also be used in portions of a wireless network, such as between cells or access points.

Wireless communication technologies are used in connection with many applications, including, for example, satellite communications systems, portable digital assistants (PDAs), laptop computers, and mobile devices (e.g., cellular telephones, user equipment). Users of such devices can connect to a network (e.g., the Internet). When these devices initially connect to a network, gateways in the network select downstream network nodes for establishing network connections or network sessions with the devices.

BRIEF DESCRIPTION OF THE DRAWINGS

Various objects, features, and advantages of the present disclosure can be more fully appreciated with reference to the following detailed description when considered in connection with the following drawings, in which like reference numerals identify like elements. The following drawings are for the purpose of illustration only and are not intended to be limiting of the invention, the scope of which is set forth in the claims that follow.

DESCRIPTION OF EXAMPLE EMBODIMENTS

Overview

Figure 1:
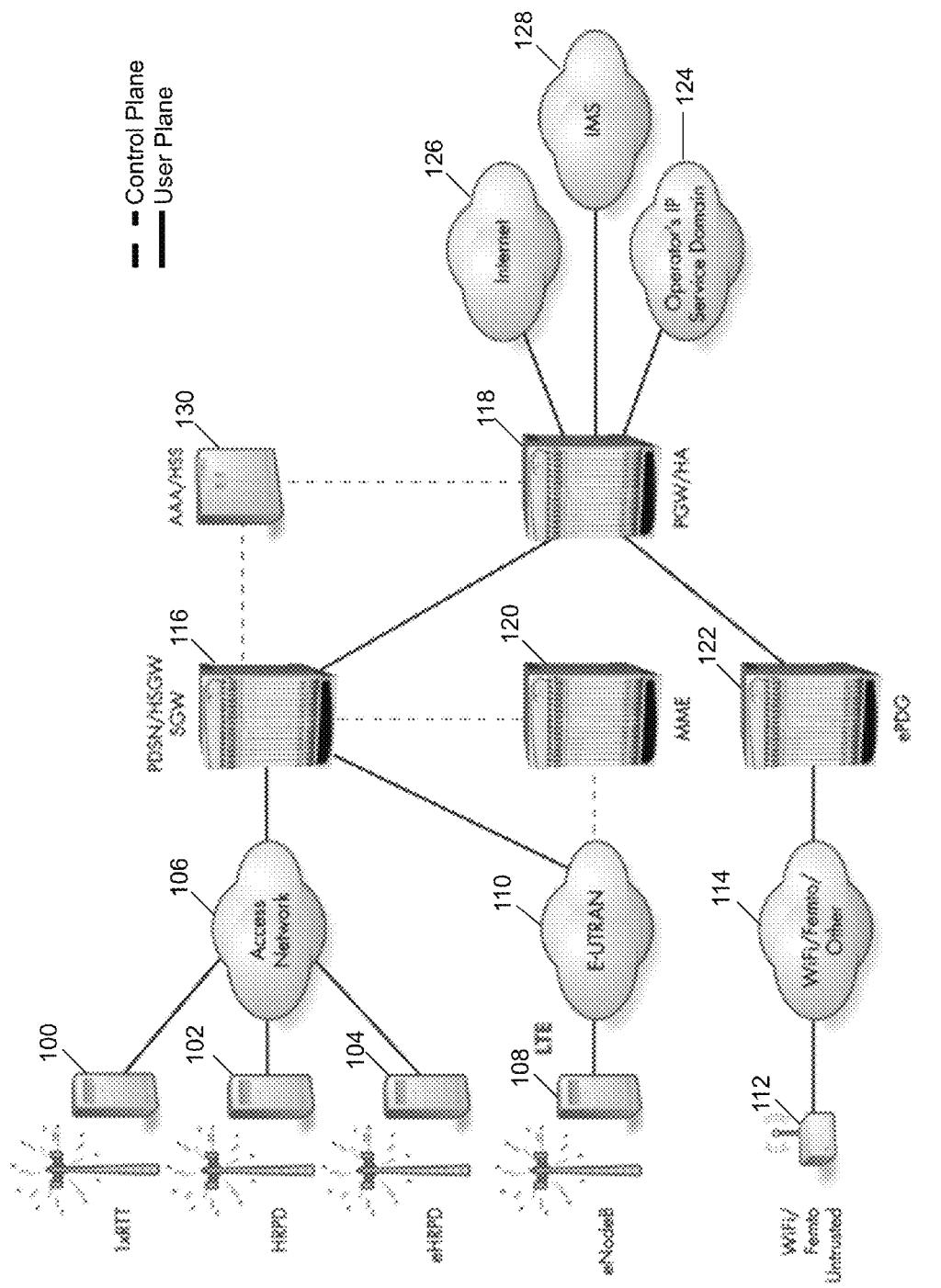
FIGS. 1-3 illustrate communication networks including a long term evolution (LTE) topology that implements node selection mechanisms in accordance with certain embodiments.

Embodiments of the present disclosure include a method. The method can include receiving, over an interface, an attach request from an eNodeB. For example, a mobile device such as a User Equipment (UE) may initiate the attach request to the eNodeB, which then passes along the request. The method can also include determining a network selection hint for the received attach request. The method can further include determining a domain name for receiving a created network connection based on the network selection hint, where the selected domain name is associated with a virtual network node in a mobile cloud network. The method can include selecting a virtual network node associated with the determined domain name, and establishing a network session to the selected virtual network node.

Example Embodiments

Generally, node selection describes ways in which, during initial long-term evolution (LTE) session setup, network nodes such as a mobility management entity (MME), session gateway (SGW) or packet data network gateway (PGW) are chosen for use during a network session such as an LTE session. The present node selection systems and methods allow selection of virtual network nodes in a virtual evolved packet core (vEPC) network. Based on an initial attach request from a user equipment (UE), the present methods determine a network selection hint. In some embodiments, the network selection hint may be based on a user profile received from a Home Subscriber Server (HSS). The present systems and methods determine a corresponding domain name for the desired virtual network node. In some embodiments, the virtual network node can include a virtual SGW (vSGW) or a virtual PGW (vPGW). The present systems and methods proceed to create a network session with the selected virtual network node.

The present node selection systems and methods expand the scope of traditional node selection to be more flexible. In particular, the present node selection systems and method allow for selecting virtual network nodes such as virtual session gateways (vSGW) and virtual packet data network gateways (vPGW) that may be driven by the subscriber itself and not merely how the subscriber connects.

Because networks are built on dedicated hardware and software with long development cycles, it can be useful to leverage cloud architecture to virtualize these resources, so as to provide agility to deliver services.

Machine-to-Machine (M2M) service support is a growing area for service providers to support more devices than have been seen by traditional voice, data, and video device market. Because of the diversity of the types of these M2M solutions or use cases within this expanding market, leveraging a cloud architecture to virtualize necessary services will give service providers needed flexibility to deliver specific service.

In the present disclosure, FIGS. 1-10 illustrate embodiments of topologies and architectures for a virtual evolved packet core (EPC) network, also referred to as a mobile cloud network (MCN). FIGS. 11-21 illustrate embodiments of node selection mechanisms for the virtual EPC network.

Mobile Cloud Network (MCN) Architecture

FIG. 1 illustrates a communication network that includes a node selection mechanism in accordance with certain embodiments. FIG. 1 includes a number of radio access technologies such as a 1×RTT transceiver 100, a high-rate packet data (HRPD) transceiver 102, and an evolved high-rate packet data (eHRPD) transceiver 104, each of which can connect to an access network 106. An evolved Node B (eNodeB) transceiver 108 is an LTE network radio network component that connects to an Evolved UMTS Terrestrial Radio Access Network (E-UTRAN) 110. Other radio access technologies such as WiFi, Femto, WiMAX, or any other radio spectrum technology can use transceiver 112 to connect to the network using a broadband or other access network.

The access network 106 can communicate with an access gateway 116 that implements a combination of functionalities such as a packet data serving node (PDSN), a HRPD serving gateway (HSGW), and a serving gateway (SGW). In operation, the PDSN functionality can be used with 1×RTT 100 and HRPD 102, the HSGW functionality can be used with eHRPD 104, and the SGW functionality can be used with the eNodeB 108. The access gateway 116 can communicate with an anchor gateway 118, which can implement a packet data network gateway (PGW) and a Home Agent (HA) and a mobility management entity (MME) 120. On the access network side, the anchor gateway 118 can also communicate with an evolved packet data gateway (ePDG) 122 which provides connectivity to the WiFi/Femto/other transceiver 112. On the packet core side, the anchor gateway can communicate with the operator's IP service domain 124, the internet 126, and IP multimedia subsystem (IMS) 128. An authentication, authorization, and accounting (AAA) server/home subscriber server (HSS) 130 can communicate with the access gateway 116, the anchor gateway 118, or both.

Home Subscriber Server (HSS) 130 can be a master user database that supports IMS network entities that handle calls. HSS 130 stores subscription-related information (subscriber profiles), performs authentication and authorization of the user, and can provide information about the subscriber's location and IP information. As used in the present node selection mechanisms, HSS 130 responds to subscription requests from mobility management entity (MME) 120. HSS 130 can provide subscription data using Update-Location Answer (ULA) responses by accessing its user database and providing the user information to MME 120. AAA server 130 can provide authentication, access control, and accounting to the network. The authentication can involve verification of the subscriber, the access control can involve granting or denying access to specific services, and the accounting that can take place is the tracking of the use of network resources by subscribers. Other servers, such as the Home Location Register (HLR) can be used in other embodiments. In certain embodiments, the AAA functionality of AAA/HSS 130 can communicate with the access gateway 116 for charging purposes.

The LTE communication network includes a PDN gateway (PGW) 118, a serving gateway (SGW) 116, an E-UTRAN (evolved-UMTS terrestrial radio access network) 110, and a mobility management entity (MME) 120. The evolved packet core (EPC) of an LTE communications network includes MME 120, SGW 116 and PGW 118 components. In some embodiments, one or more EPC components can be implemented on the same gateway or chassis as described below.

The SGW sits in the user plane where it forwards and routes packets to and from the eNodeB and PGW. The SGW also serves as the local mobility anchor for inter-eNodeB handover and mobility between 3GPP networks. The SGW routes and forwards user data packets, while also acting as the mobility anchor for the user plane during inter-eNodeB handovers and as the anchor for mobility between LTE and other 3GPP technologies (terminating S4 interface and relaying the traffic between 2G/3G systems and PGW). For idle state UEs, the SGW terminates the down link data path and triggers paging when down link data arrives for the UE. The SGW manages and stores UE contexts, e.g. parameters of the IP bearer service and network internal routing information. The SGW also performs replication of the user traffic in case of lawful interception.

The PGW acts as the interface between the LTE network and other packet data networks, such as the Internet or SIP-based IMS networks (fixed and mobile). The PGW serves as the anchor point for intra-3GPP network mobility, as well as mobility between 3GPP and non-3GPP networks. The PGW acts as the Policy and Charging Enforcement Function (PCEF), which manages Quality of Service (QoS), online/offline flow-based charging data generation, deep-packet inspection, and lawful intercept. The PGW provides connectivity to the UE to external packet data networks by being the point of exit and entry of traffic for the UE. A UE may have simultaneous connectivity with more than one PGW for accessing multiple packet data networks. The PGW performs policy enforcement, packet filtering for each user, charging support, lawful interception, and packet screening. The PGW also provides an anchor for mobility between 3GPP and non-3GPP technologies such as WiMAX and 3GPP2 standards (CDMA 1X and EVDO).

The MME resides in the EPC control plane and manages node selection, session states, authentication, paging, mobility with 3GPP 2G/3G nodes, roaming, and other bearer management functions. The MME can be a standalone element or integrated with other EPC elements, including the SGW, PGW, and Release 8 Serving GPRS Support Node (SGSN). The MME can also be integrated with 2G/3G elements, such as the SGSN and GGSN. This integration is the key to mobility and session management interworking between 2G/3G and 4G mobile networks.

MME 120 is a control-node for the LTE access network. The MME is responsible for UE tracking and paging procedures including retransmissions. MME 120 handles the bearer activation/deactivation process and is also responsible for node selection of an SGW and PGW for a UE at the initial attach and at time of an intra-LTE handover. The MME also authenticates the user by interacting with the HSS 130. The MME also generates and allocates temporary identities to UEs and terminates Non-Access Stratum (NAS) signaling. The MME checks the authorization of the UE to camp on the service provider's Public Land Mobile Network (PLMN) and enforces UE roaming restrictions. The MME is the termination point in the network for ciphering/integrity protection for NAS signaling and handles the security key management. Lawful interception of signaling is also supported by the MME. The MME also provides the control plane function for mobility between LTE and 2G/3G access networks with the S3 interface terminating at the MME from the SGSN (not shown). The MME also terminates the S6a interface towards the home HSS for roaming UEs.

ePDG 122 is responsible for interworking between the EPC and fixed non-3GPP access technologies such as a WiFi. The ePDG 122 can use IPSec/IKEv2 to provide secure access to the EPC network. Optionally, the ePDG can use Proxy Mobile IPv6 (PMIPv6) to interact with the PGW when the mobile subscriber is roaming in an untrusted non-3GPP system. The ePDG is involved in tunnel authentication and authorization, transport level packet marking in the uplink, policy enforcement of Quality of Service (QoS) based on information received via Authorization, Authentication, Accounting (AAA) infrastructure, lawful interception, and other functions.

Figure 2:
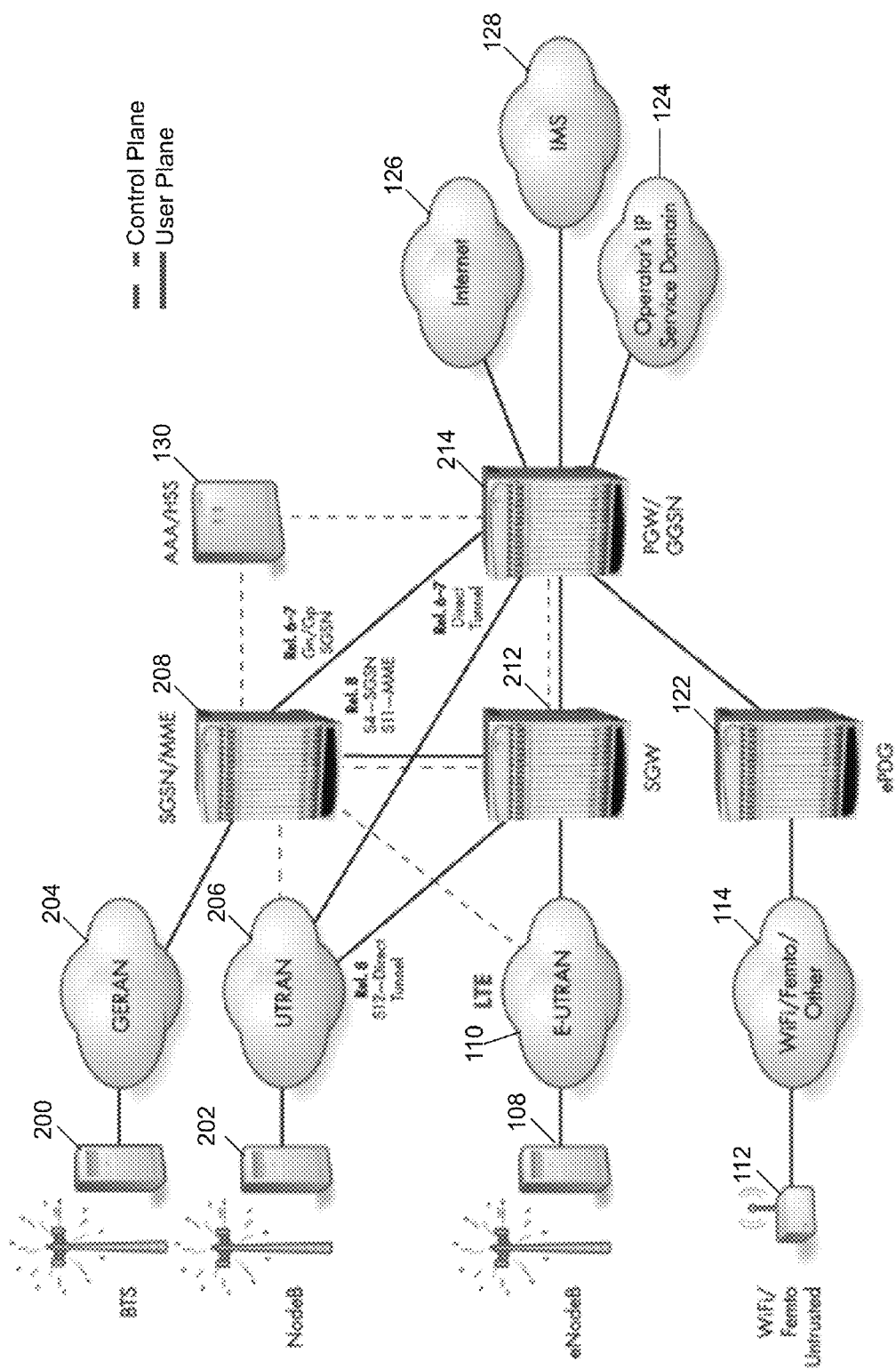

FIG. 2 illustrates a communication network that implements a node selection mechanism with legacy universal mobile telecommunications systems (UMTS) network devices in accordance with certain embodiments. The legacy transceivers include base transceiver station (BTS) 200 and NodeB transceiver 202. The BTS 200 can communicate with a GSM EDGE Radio Access Network (GERAN) 204 and the NodeB 202 can communicate with a UMTS terrestrial radio access network (UTRAN) 206. The serving GPRS support node (SGSN) can be implemented on a gateway 208 with a mobility management entity (MME). The GERAN 204 can communicate through the SGSN functionality on gateway 208 to serving gateway (SGW) 212 or gateway GPRS support node (GGSN)/PGW 214.

In some embodiments, the present node selection mechanisms can be implemented on a gateway, such as SGSN/MME 208. Gateway 208 can access and maintain information relating to the communication session, the subscriber, the available network nodes, the radio bearers, and the policies relating to the communication session. Gateway 208 may be used to provide various services to a mobile device and implement node selection for mobile devices on initial attach. The communication networks also allow provision of applications such as VoIP, streaming video, streaming music, mutli-user gaming, location based services, and a variety of content delivered to a mobile node. Residing within gateway 208 can be one or more network processing units, line cards, as well as packet and voice processing cards.

Figure 3:
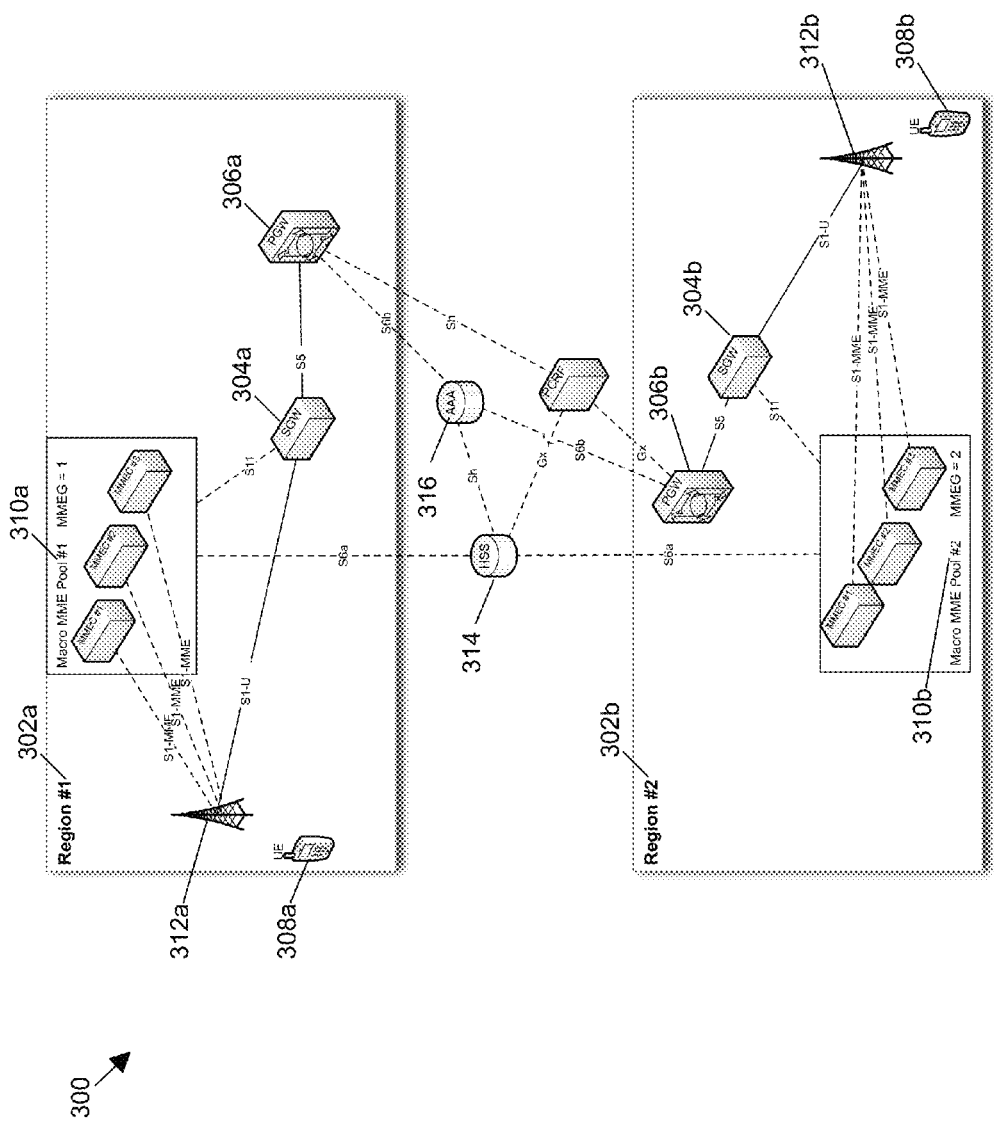

FIG. 3 illustrates a communication network 300 including a long term evolution (LTE) topology in accordance with certain embodiments. FIG. 3 includes Region #1 (302*a*), Region #2 (302*b*), home subscriber server (HSS) 314, and authentication, authorization, and accounting (AAA) server 316. Region #1 (302*a*) includes user equipment (UE) 308*a*, evolved Node B (eNodeB) 312*a*, macro mobility management entity (MME) pool #1 (310*a*), serving gateway (SGW) 304*a*, and packet data network gateway (PGW) 306*a*. Region #2 (302*b*) includes UE 308*b*, eNodeB 312*b*, macro MME pool #2 (310*b*), SGW 304*b*, and PGW 306*b*.

As described earlier, node selection describes methods by which, during initial network session setup such as LTE session setup, an MME, SGW and PGW are chosen for the LTE session. Traditionally, node selection is performed by the first gateway to receive a User Equipment (UE) connection, such as from UE 308*a*. For example, in a traditional deployment, eNodeB 312*a* and an MME from macro MME pool 310*a* might initiate node selection if UE 308*a* connected to Region #1 (302), and if UE 308*a* sent an initial attach request. Generally, the MME performs much of the traditional node selection. Selected network nodes may include SGWs and PGWs. For example, on an initial attach procedure from UE 308*a*, a result of node selection may be that an MME from macro MME pool 310 selects SGW 304*a* and PGW 306*a* to handle a session for UE 308*a*. Node selection generally was defined by the 3rd Generation Partnership Project (3GPP), whose Technical Standard 23.401 describes traditional node selection, the entire contents of which are expressly incorporated by reference herein. As illustrated in FIG. 3, traditional node selection has focused on region-based or geography-based node selection, e.g., selecting nodes that are regionally or geographically located in a desired market.

For example, service providers have regions they try to cover with specific cell sites. Example regions include region #1 (302*a*) and region #2 (302*b*). Traditional node selection mechanisms assume a pool of MMEs, SGWs, PGWs, etc. that are regionally or geographically co-located. Furthermore, other network elements may be more centralized, such as HSS 314 or AAA 316.

As described earlier, traditional node selection mechanisms focus on location, such as regional or geographic location. For example, node selection mechanisms may select a node in a given neighborhood. There is no differentiation between users that belong to a certain community, enterprise, company, or between any other desired grouping of devices. As a result, traditional node selection mechanisms can be difficult to steer devices to desired nodes.

In contrast, the present systems and methods address situations in which node selection can be steered to different nodes for users that belong to a particular company, for example. Or, the present node selection mechanisms allow steering a set of devices including companies that work with gas meters. Furthermore, the regional or geographical location of nodes in virtualized evolved packet core (EPC) networks according to the present systems and methods may differ from the traditional location of region sites such as region #1 (302*a*) and region #2 (302*b*). In contrast, nodes in virtual EPC networks according to the present systems may be data centers that are distributed and grouped differently from traditional groupings. For example, as described in further detail below, one set of virtual network nodes may be in data centers located in Boston and another set may be in data centers located in Dallas. The present node selection systems and methods are able to steer devices to any desired location, unaffected by region or geography of the virtual network nodes.

Traditional node selection mechanisms assume that nodes in the EPC network are grouped based on region or geography. The present systems and methods allow devices to be grouped into virtual groupings, tenants, or communities. The present virtualized EPC elements allow virtual grouping of core network elements for those communities. For example, a gas-metering community may group virtual SGWs (vSGW), PGWs (vPGW), and policy charging and rules functions (vPCRF) as virtual nodes in specific data centers in specific locations for that community. Advantageously, the present systems allow virtual resources to grow or shrink dynamically. Generally, devices for the gas-metering company may receive a first set of virtual resources, and devices for another company such as a bank may select or receive another set of virtual resources.

Traditional node selection by service providers is mainly designed around the principle that evolved packet core (EPC) elements (e.g., MMEs, SGWs 304*a*-304*b*, PGWs 306*a*-306*b*) are selected using geographically closest nodes. A summary of traditional node selection algorithms follows.

MME Selection

Cell sites (e.g., eNodeBs 312*a*-312*b*) are all configured with and attach to a macro MME pool 310*a*-310*b* associated with a specific geographic location. S1-MME connections initiated from cell sites 312*a*-312*b* use one of the MMEs in macro MME pools 310*a*-310*b*. Each cell site 312*a*-312*b* has a stream control transmission protocol (SCTP) connection setup to each MME in macro MME pools 310*a*-310*b*.

SGW Selection

The region-dependent model is demonstrated in traditional node selection methods for SGW selection. At a high level, the MME creates a fully-qualified domain name (FQDN) based on a high byte and low byte of an associated tracking area identity (TAI) or tracking area code (TAC), and a specific domain. The MME queries the domain name server (DNS) with this TAI-based FQDN for the SGW address. 3GPP Technical Standard 23.003, the entire contents of which are incorporated by reference herein, further describes construction of a corresponding TAI-based or TAC-based FQDN.

PGW Selection

Traditionally, MMEs support the general requirements for PGW selection described below. Requirements for traditional node selection of PGWs by MMEs are further described in 3GPP Technical Standard 23.401. Generally, the Update-Location Answer (ULA) message from the HSS over the S6a interface contains information regarding the access point name (APN), specifically in the Subscription Data attribute-value pair (AVP). If the UE did not send an APN during initial attach, the MME uses the default APN, creates the default APN FQDN, and queries the domain name server (DNS) for the Internet protocol (IP) address of the PGW. Otherwise, the MME uses the APN received in the PDN connectivity request or in the Attach Request from the UE to select the PGW.

In particular, traditional node selection by the MME supports the following behavior from 3GPP Technical Standard 29.303, the entire contents of which are incorporated by reference herein. When co-location and topological ordering applies, regionally or geographically co-located sets of nodes receive highest importance, followed by sets of nodes with "topon" and having the most labels in their common suffix, followed by sets of nodes with "topon" and having the second most number of labels and so on, until node selection reaches non-co-located nodes with "topon." Within sets having the same location or topological order, then traditional node selection uses S-NAPTR order of one of the two nodes.

Figure 4:
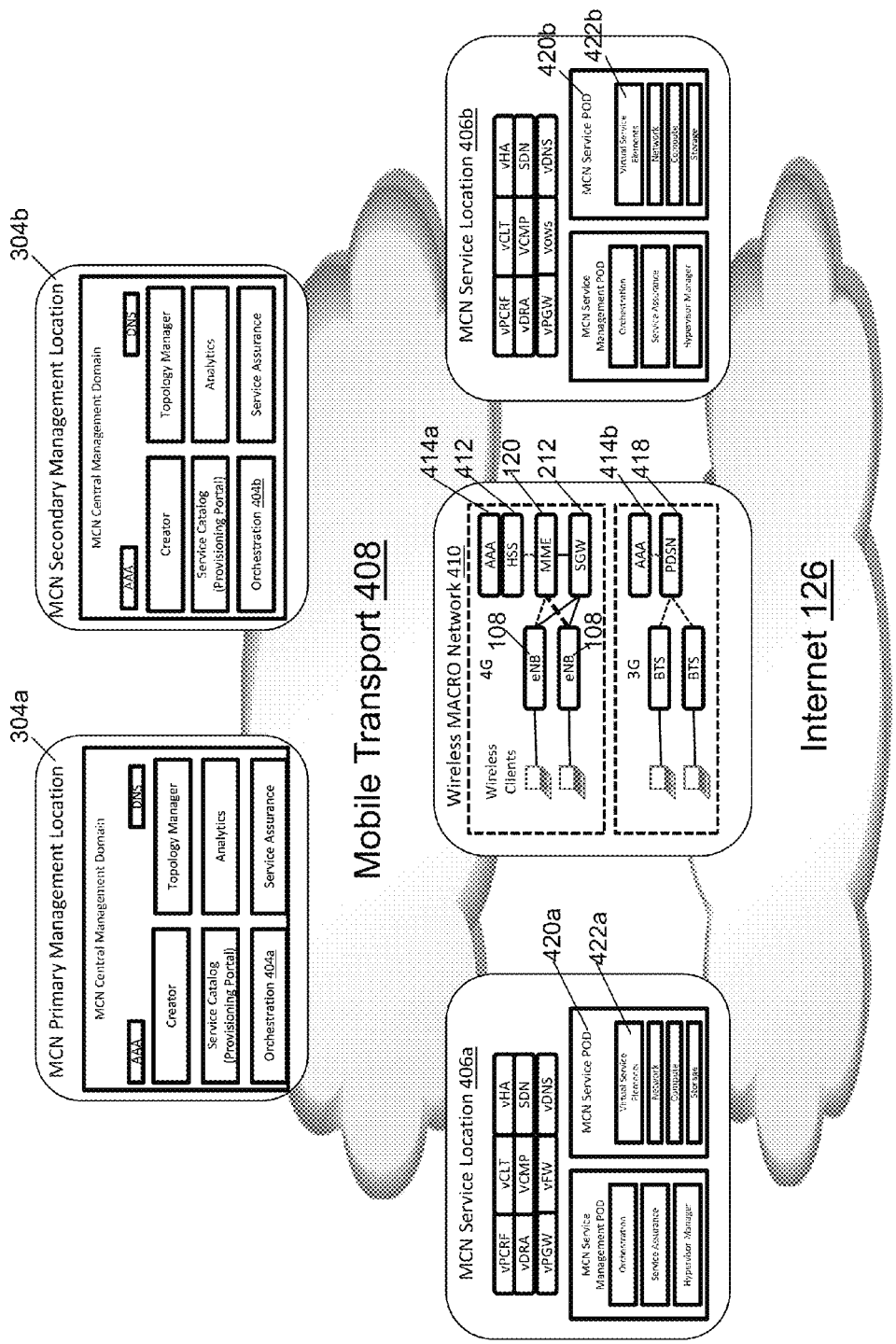
FIG. 4 illustrates a mobile cloud network platform in accordance with certain embodiments.

FIG. 4 illustrates a mobile cloud network platform in accordance with certain embodiments. FIG. 4 includes wireless macro network 410, MCN Service Locations 406a-406b, MCN Primary and Secondary Management Locations 304a-304b, Mobile Transport 408, and Internet 126.

Generally, the present systems and methods provide node selection mechanisms for virtual evolved packet core (EPC) networks. As used herein, the cloud-based architecture model and the present virtual EPC networks may also be referred to as "mobile cloud networks" (MCN). In some embodiments, service providers may provide MCN implementations.

In some embodiments, eNodeBs 108 are not virtualized in the present virtual EPC networks, and instead are physical gateways or devices sitting atop towers. The other network nodes in wireless macro network 410 may be virtualized, such as authentication, authorization, and accounting servers (AAA) 414a-414b, home subscriber server (HSS) 412, mobility management entity (MME) 120, serving gateway (SGW) 212, packet data serving node (PDSN) 418, and the like. As used herein, a "mobile cloud network (MCN) service location" refers to a grouping of virtualized functions for specific communities, enterprises, or even desired groups of users. For example, MCN service locations 406a-406b may be virtualized sites having datacenter equipment using a POD-based infrastructure. As defined below in connection with FIG. 7, a POD generally refers to a set of physical hardware or software resources such as CPU, memory, bandwidth, storage, and the like, used in a specific physical location or data center. As a further example, the present virtual networks can include MCN Service PODs 420a-420b. POD-based infrastructures used in the present systems are discussed in further detail below.

In some embodiments, the present virtual networks also provide management capabilities for managing hardware and services. For example, MCN Primary Location 304a and MCN Secondary Location 304b may implement management functions. One example function includes orchestration, such as with Orchestration modules 404a-404b. Orchestration allows the creation of virtual service elements (VSE) such as VSEs 422a-422b in a desired specific virtual location for a desired community as directed. A result of orchestration may be creation of a virtualized configuration and templates for virtual network nodes, such as a virtual packet data network gateway (vPGW) template. That is, the present virtual mobile cloud networks allow an administrator to click buttons and create a vPGW that belongs to a desired virtual community, such as a community of gas-meter companies. An administrator can simply assign the virtual configuration and virtual PGW template into, for example, an MCN service location such as a Dallas data center, and even more specifically into POD #3, and the MCN is easily managed. Generally, orchestration populates necessary network elements that need to know about a created virtual network element, updates relevant domain name servers (DNS), and generally performs management for the virtual network element to be able to interact with the virtual network. Accordingly, the next time a user tries to attach to the cellular network, the created virtual PGW is now part of the virtual pool. Similarly, orchestration allows a virtual service element such as a virtual PGW to be removed just as easily.

Specifically, according to the present node selection mechanisms, when a device such as a user equipment (UE) attaches, the device requests from a cell site or eNodeB 108 to be connected to the network. MME 120 checks the device's credentials, selects nodes to receive the connection, and communicates with the selected nodes over an S6a interface to determine the device's profile. When MME 120 receives the device profile, the profile may describe numerous attributes. In some embodiments, a Serving General Packet Radio Service (GPRS) Support Node (SGSN) may use an interface toward a Home Subscriber Server/Home Location Register (HSS/HLR) to determine the profile attributes. Example profile attributes may instruct other network nodes as to whether the user and device are part of a community. In some embodiments, a gateway parses a received fully-qualified domain name (FQDN) for these details. The gateway is able to use this information to steer a connection (1) from the UE to a virtualized set of devices (or non-virtualized set of devices) to which the device belongs as part of a community, (2) to desired data center locations, or (3) to select or allocate specific sets of resources to use from a gateway or policy perspective, if the user or device belongs to a specific enterprise or other community. The present node selection methods are described in further detail later, in connection with FIG. 16. As described earlier, in some embodiments a fully-qualified domain name (FQDN) can help select the virtual network nodes to which a device will be sent. For example, the present node selection mechanisms can steer devices belonging to gas-meter communities in California or on the West Coast to data centers on the West Coast, and steer other devices to data centers on the East Coast. In further embodiments, the present systems and methods can be used once MME 120 downloads a corresponding subscriber profile from HSS 412.

Figure 5:
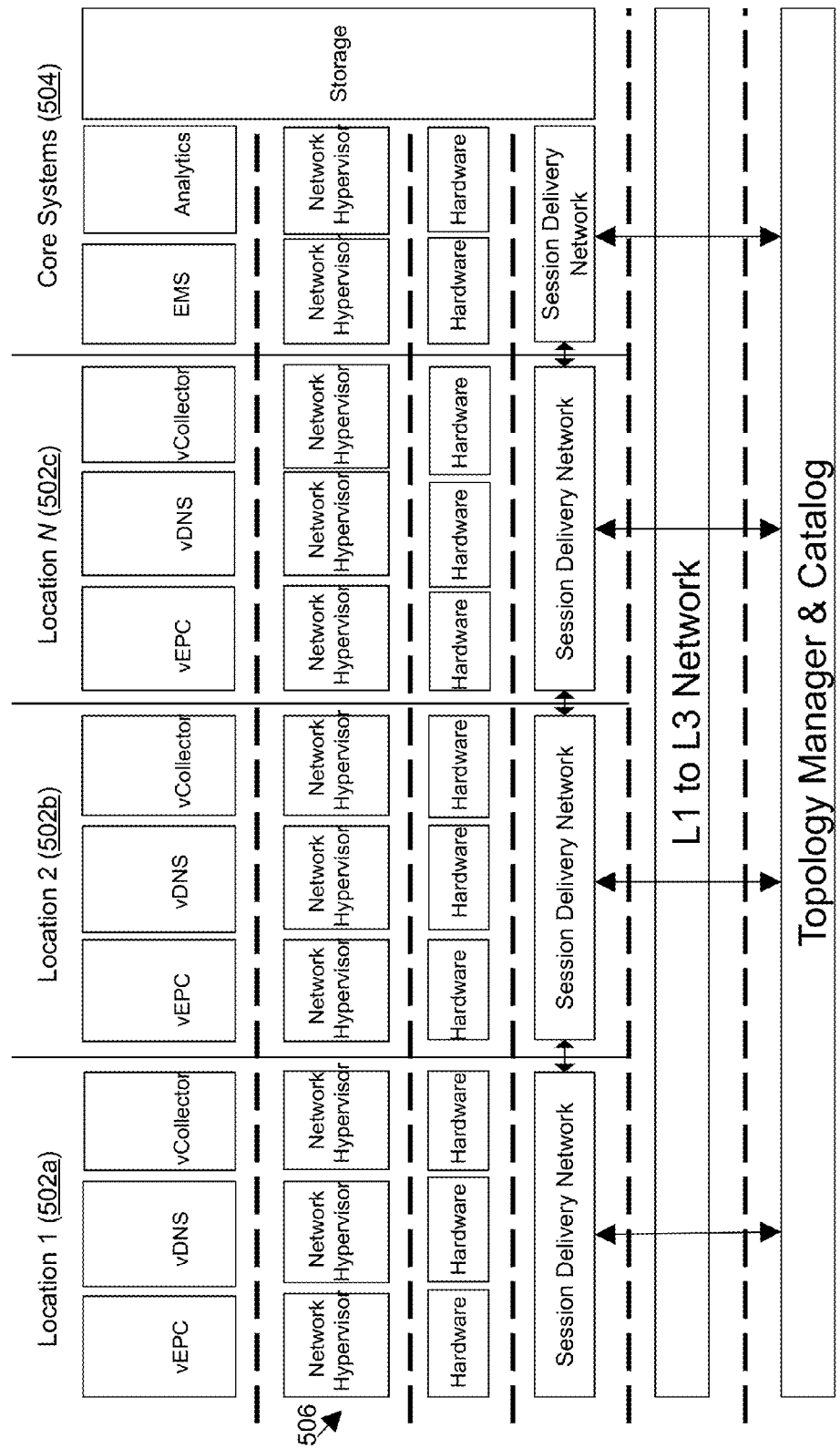
FIGS. 5-6 illustrate a mobile cloud network logical architecture in accordance with certain embodiments.

FIG. 5 illustrates a mobile cloud network logical architecture in accordance with certain embodiments. FIG. 5 includes locations 1-N (502a-502c), core systems 504, and network hypervisor layer 506.

The present systems create and operate virtual network infrastructure that virtualizes and utilizes industry standard servers and attached network and storage into unified virtual resource pools. In some embodiments, the mobile cloud network may support critical network infrastructure including evolved packet core (EPC), Internet protocol multimedia subsystems (IMS), domain name servers (DNS), analytics, fault management, performance management, authentication, encryption and decryption, and other critical-computation-oriented systems that today are functions operating on stand-alone hardware.

Figure 6:
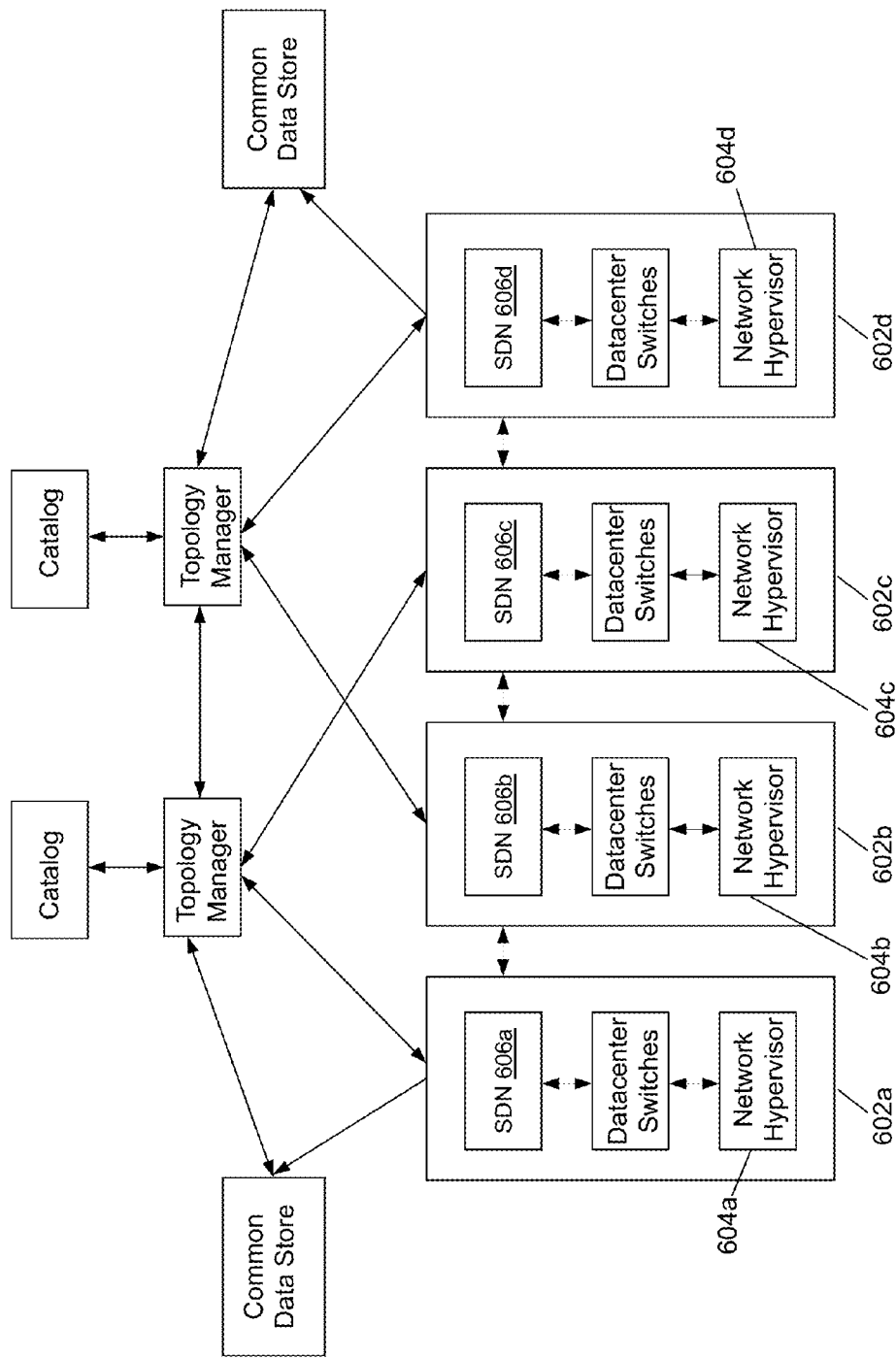

FIGS. 5 and 6 illustrate high-level examples of how certain MCN components are logically arranged and connected. Locations 1-N (502a-502c) illustrate MCN service locations as described earlier in connection with FIG. 4. In some embodiments, the virtualized platform may be broken down into layers (illustrated in FIG. 5 using dashed lines). Network Hypervisor layer 506 includes virtualization-based distributed network infrastructure services such as resource management to dynamically and intelligently optimize available resources among virtual machines and virtual networks. Network Hypervisor layer 506 encompasses high availability principles for better service levels, data protection for reliable and cost effective disaster recovery, dynamic load balancing to cost effectively achieve high performance, as well as security and integrity to better protect existing infrastructure investments from typical datacenter vulnerabilities. Basically the infrastructure can support any of the functions of the operator network and hence can support the rapid deployment of services and network elements.

FIG. 6 illustrates mobile cloud network connectivity in accordance with certain embodiments. FIG. 6 includes data centers 602a-602d, network hypervisors 604a-604d, and session defined networks (SDN) 606a-606d.

As described earlier, data centers may correspond to desired locations used in a mobile cloud network (MCN). For example, data center 602a may be located in San Francisco, Calif., US while data center 602b is located in Washington, D.C., US. Similarly, data center 602c may be located in Minneapolis, Minn., US and data center 602d may be located in New Orleans, La., US. As described earlier, data centers 602a-602d use network hypervisors 604a-604d and session defined networks 606a-606d to provide virtualization-based distributed network infrastructure services.

Figure 7:
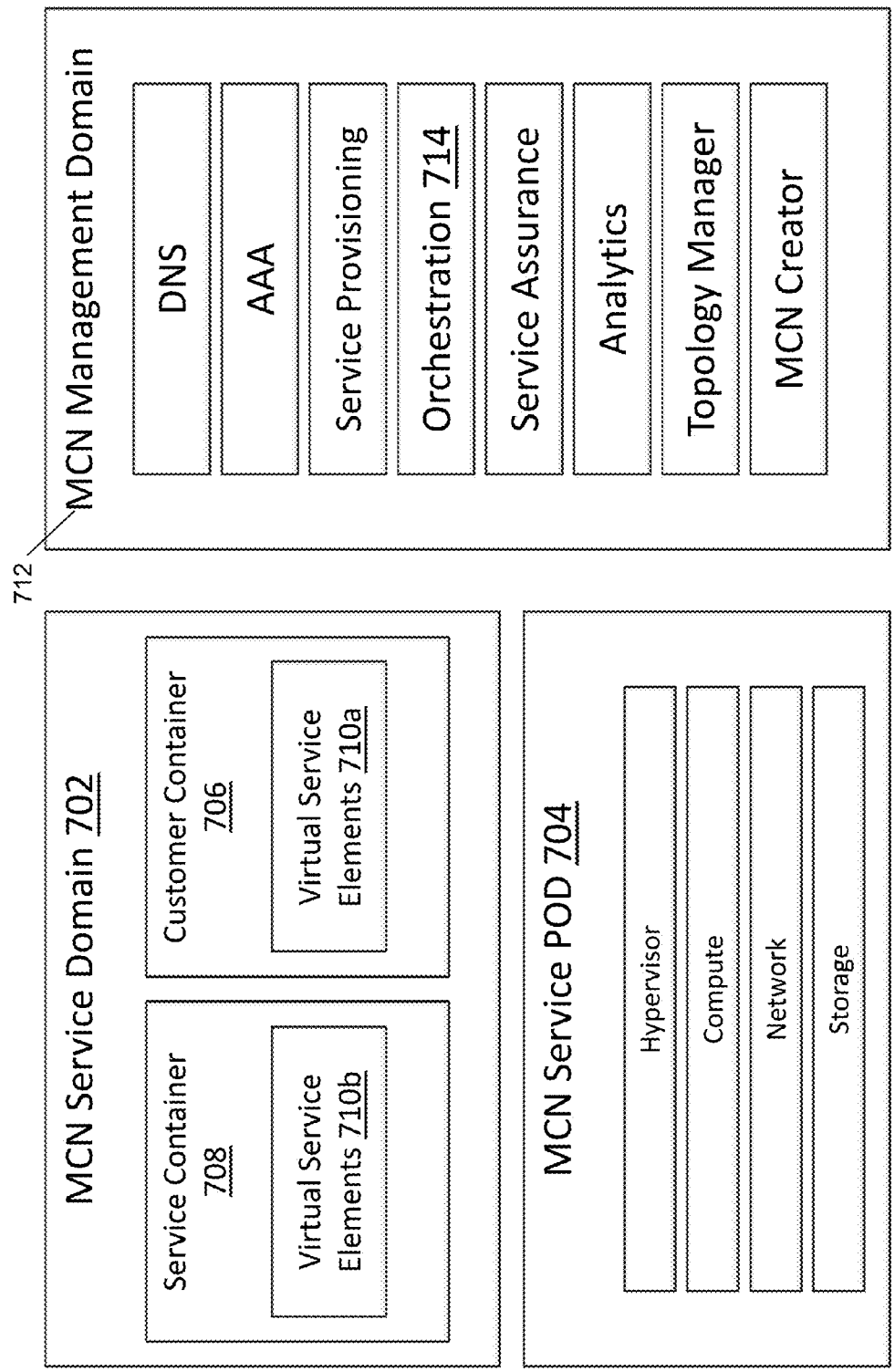
FIGS. 7-10 illustrate mobile cloud network domains in accordance with certain embodiments.

FIG. 7 illustrates mobile cloud network domains in accordance with certain embodiments. FIG. 7 includes MCN Service Domain 702, MCN Management Domain 712, and MCN Service POD 704.

As used herein, an "MCN POD" refers to a set of physical hardware or software resources such as CPU, memory, bandwidth, storage, and the like, used in a specific physical location or data center. MCN Service POD 704 represents an example MCN POD.

As used herein, a "virtual service element" (VSE) refers to a service that has been virtualized, such as a virtual packet data network gateway (vPGW), virtual session gateway (vSGW), or virtual mobility management entity (vMME). VSEs 710a-710b are examples of virtual service elements.

As used herein, a "tenant" or "community" refers to a customer or consumer who uses virtual resources on an MCN POD. Example communities may include soft drink communities for soft drink companies.

As used herein, an "MCN Container" refers to a grouping of virtual service elements (VSEs) for a particular community on a specific MCN POD. Service Container 708 and Customer Container 706 are examples of MCN Containers.

As used herein, an "MCN Domain" refers to sets of virtual services and resources for a specific consumer. The term "MCN Domain" can sometimes refer interchangeably to an "MCN Service Domain" such as MCN Service Domain 702, or an "MCN Management Domain" such as MCN Management Domain 712. An MCN Service Domain refers to virtual services and virtual resources provided to users or consumers. An MCN Management Domain refers to services for administrators to administer or manage mobile cloud networks. MCN Management Domain 712 may support orchestration, for example using Orchestration module 714.

In some embodiments, each consumer has its own MCN Domain such as MCN Service Domain 702, with the ability to provision any virtual service elements (VSEs) 710b based on user roles and responsibilities. In some embodiments, an MCN Domain is required to be defined or provisioned at a location, before an administrator is able to provision VSEs. Generally an MCN Domain leverages previously defined MCN Containers. MCN Containers provide infrastructure resources such as servers, storage, and network resources. MCN Containers leverage virtualization to provide multi-tenant capabilities for sharing infrastructure resources between MCN Consumer Domains or MCN Service Domains.

Figure 8:
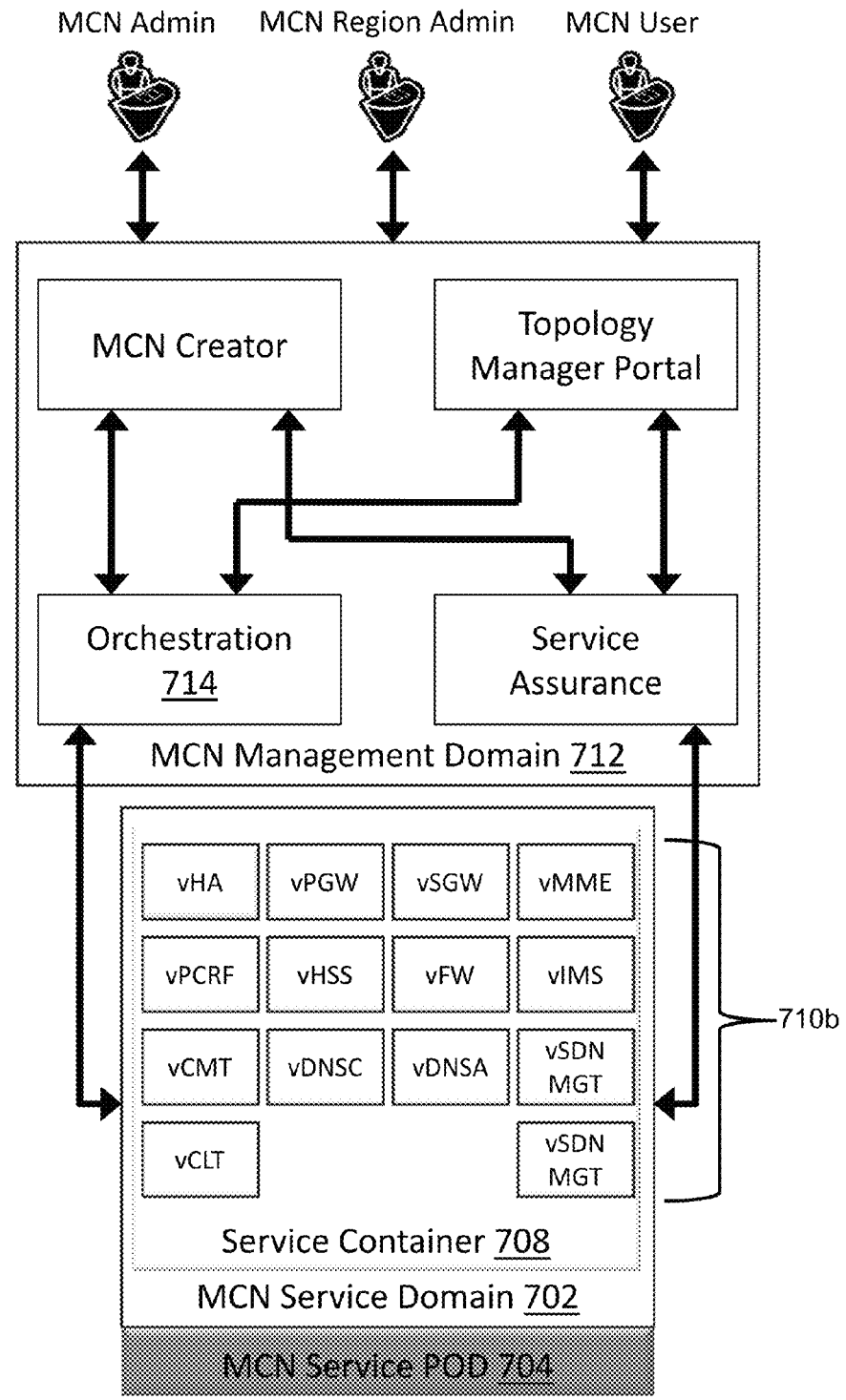

FIG. 8 illustrates another example view of mobile cloud network domains in accordance with certain embodiments. FIG. 8 includes MCN Management Domain 712 and MCN Service POD 704. MCN Service POD 704 contains MCN Service Domain 702. MCN Service Domain 702 contains Service Container 708.

Service Container 708 allows creation of virtual service elements (VSEs) 710b. Example VSEs include a virtual Home Agent (vHA), virtual packet data network gateway (vPGW), virtual session gateway (vSGW), virtual mobility management entity (vMME), virtual policy charging and rules function (vPCRF), virtual home subscriber server (vHSS), virtual firewall (vFW), virtual IP multimedia subsystem (vIMS), virtual Traffic Detection Function (vTDF), virtual Domain Name Server (vDNS), virtual session-defined network management (vSDNMGT), and virtual Carrier Grade Network Address Translation (vCNAT).

Figure 9:
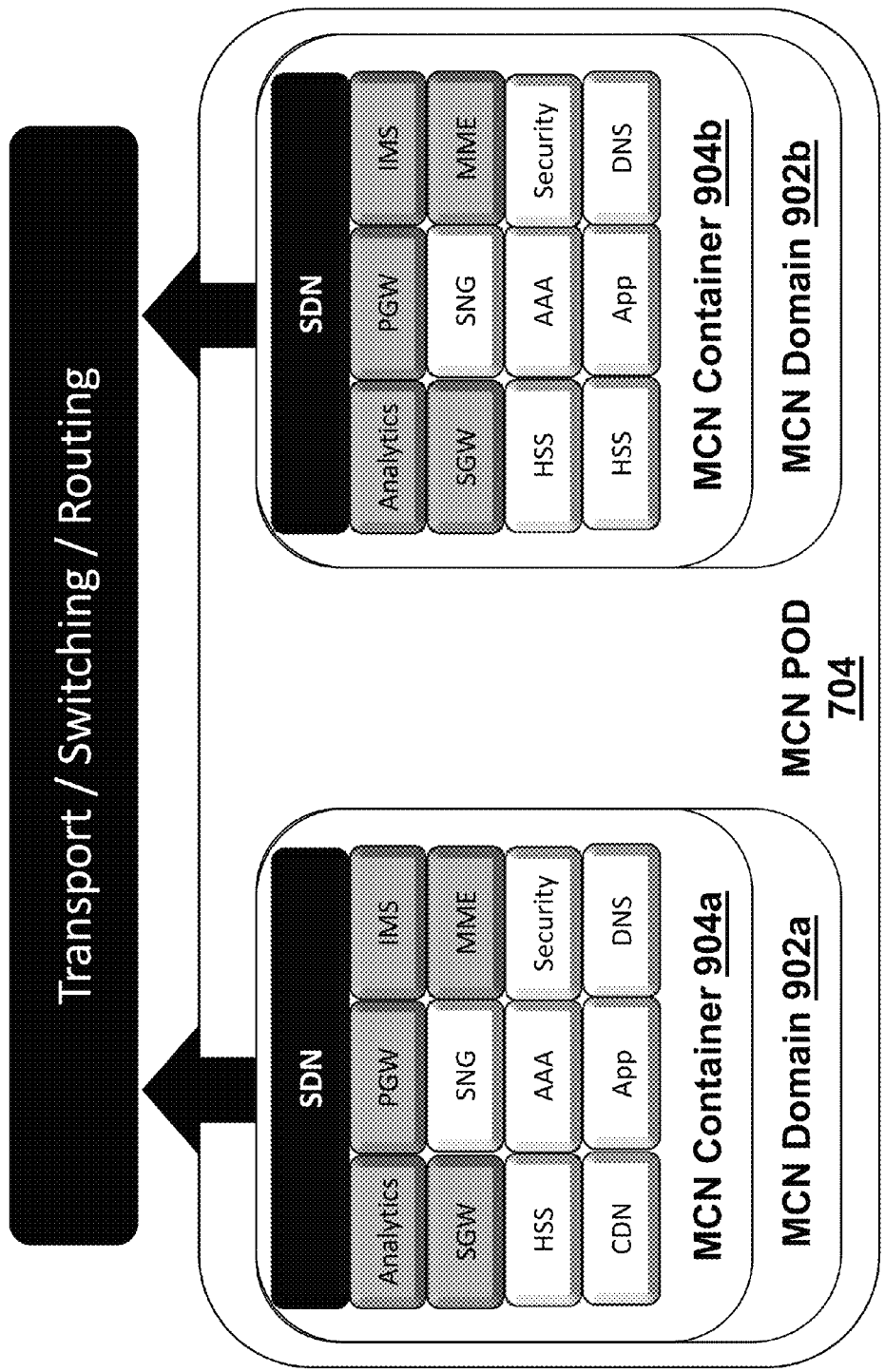

FIG. 9 illustrates mobile cloud network domains in accordance with certain embodiments. FIG. 9 includes MCN POD 704, which may include MCN Domains 902a-902b, which include MCN Containers 904a-904b.

In some embodiments, virtual locations use foundational virtual service elements (VSEs) to support an MCN Consumer Domain. Examples of VSEs may generally include SDN Grid nodes, SDN Management nodes, and vCollector nodes. MCN Domain locations have defined pools of functional resources based on MCN Containers such as MCN Containers 904a-904b. Example functional resources may generally include IP addressing nodes and domain name services (DNS).

As used herein, the term "MCN Container" refers to a finite number of physical infrastructure resources. Examples of infrastructure resources include server, storage, and network resources used to provision an MCN Domain with virtual service elements (VSEs). MCN Domains may support multiple MCN Containers. To scale MCN Domains such as MCN Domains 902a-902b, administrators generally add more MCN Containers. Adding more MCN Containers may increase available pools of physical server, storage, and network resources. Because an MCN Container can provide a pool of resources for multiple MCN Domains, the MCN Container leverages virtualization to share resources. An MCN Container is similar to a POD within a cloud-based Infrastructure as a Service (IaaS) architecture that supports multi-tenant architectures such as multiple MCN Consumer Domains. Similarly, MCN Containers can leverage IaaS-style features for connectivity when appropriate. If IaaS features are unavailable, MCN Containers can use session-defined networks (SDN).

Figure 10:
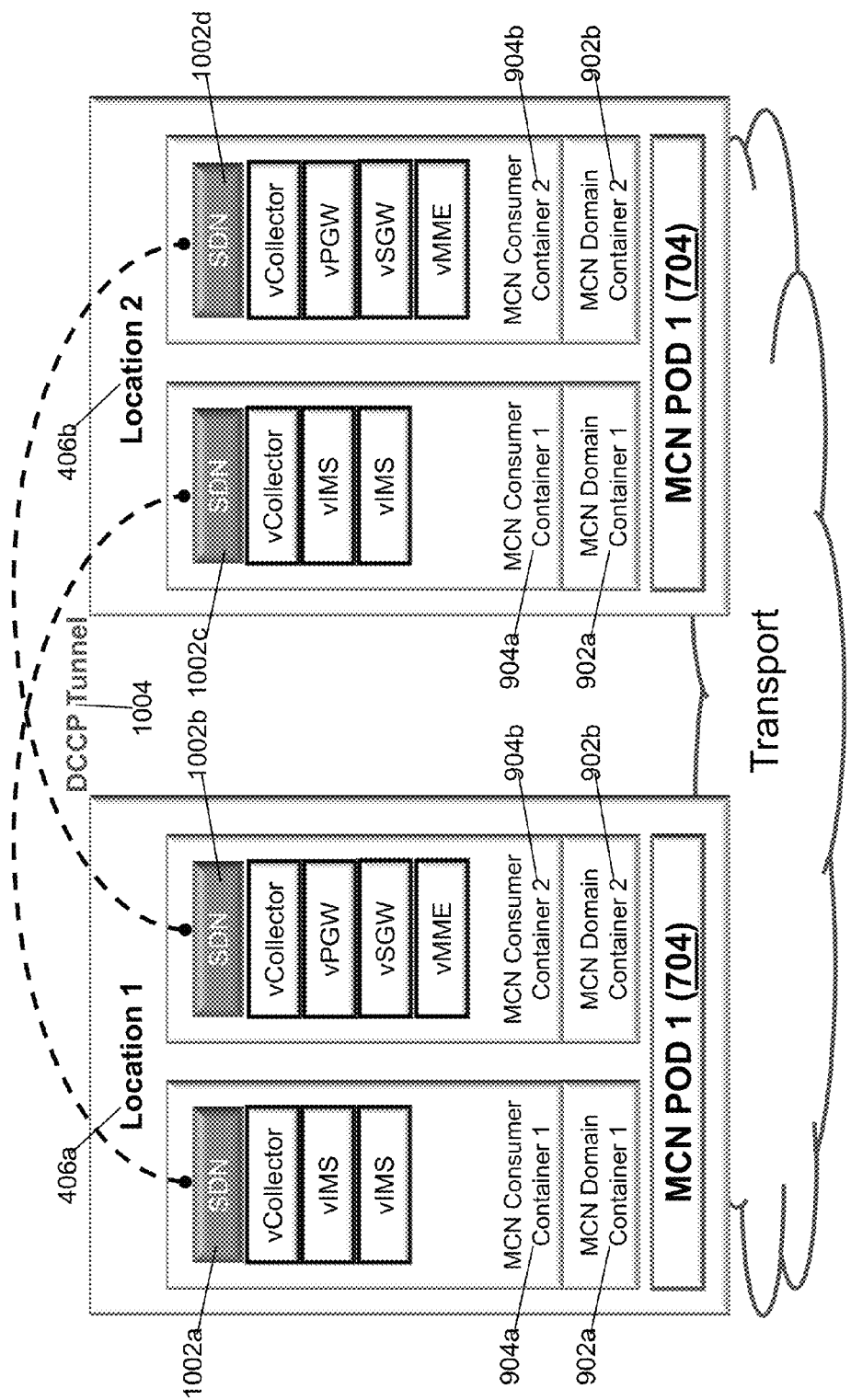

FIG. 10 illustrates mobile cloud network inter-domain connectivity in accordance with certain embodiments. FIG. 10 includes Location 1 (406a) and Location 2 (406b), connected by datagram congestion control protocol (DCCP) tunnels 1004.

As described earlier, a mobile cloud network (MCN) may span multiple locations, such as Location 1 (406a) and Location 2 (406b). For example, a new consumer XYZ may want to order a packet data network gateway (PGW), serving gateway (SGW), and mobility management entity (MME) for locations corresponding to Colorado Springs, Colo., United States (406a) and Branchburg, N.J., United States (406b).

MCN Pod 1 (704) may serve both Location 1 (406a) and Location 2 (406b) for consumers belonging to the appropriate community, tenant, or desired group defined by consumer XYZ. MCN Pod 1 (704) may contain multiple MCN Domains, such as MCN Domain 902a for Consumer 1 and MCN Domain 904a for Consumer 2. The session-defined networks (SDN) for respective MCN Domains in one location may communicate with SDNs for the same MCN Domain in another location. For example, SDN 1002a may communicate with SDN 1002c and SDN 1002b may communicate with SDN 1002d over packet tunnels. In some embodiments, the packet tunnel may be a datagram congestion control protocol (DCCP) tunnel 1004.

An administrator for consumer XYZ, referred to as an MCN Domain user, may use a Service Catalog Portal and create or provision a new MCN Domain (e.g., MCN XYZ Domain) in Location 1 (406a) (e.g., Colorado Springs, Colo.) and Location 2 (406b) (e.g., Branchburg, N.J.). The present systems may provision a pool of resources and create needed foundational virtual service elements (VSEs) (e.g., session-defined network (SDN) Grid Nodes, SDN Management Nodes, vCollector Nodes) at each location or site. Once SDN XYZ Domain is available at each site, the MCN Domain Administrator or MCN Domain User may provision each service within the evolved packet core (EPC) network (PGW, SGW, and MME) using the Service Catalog Portal.

Node Selection

Figure 11:
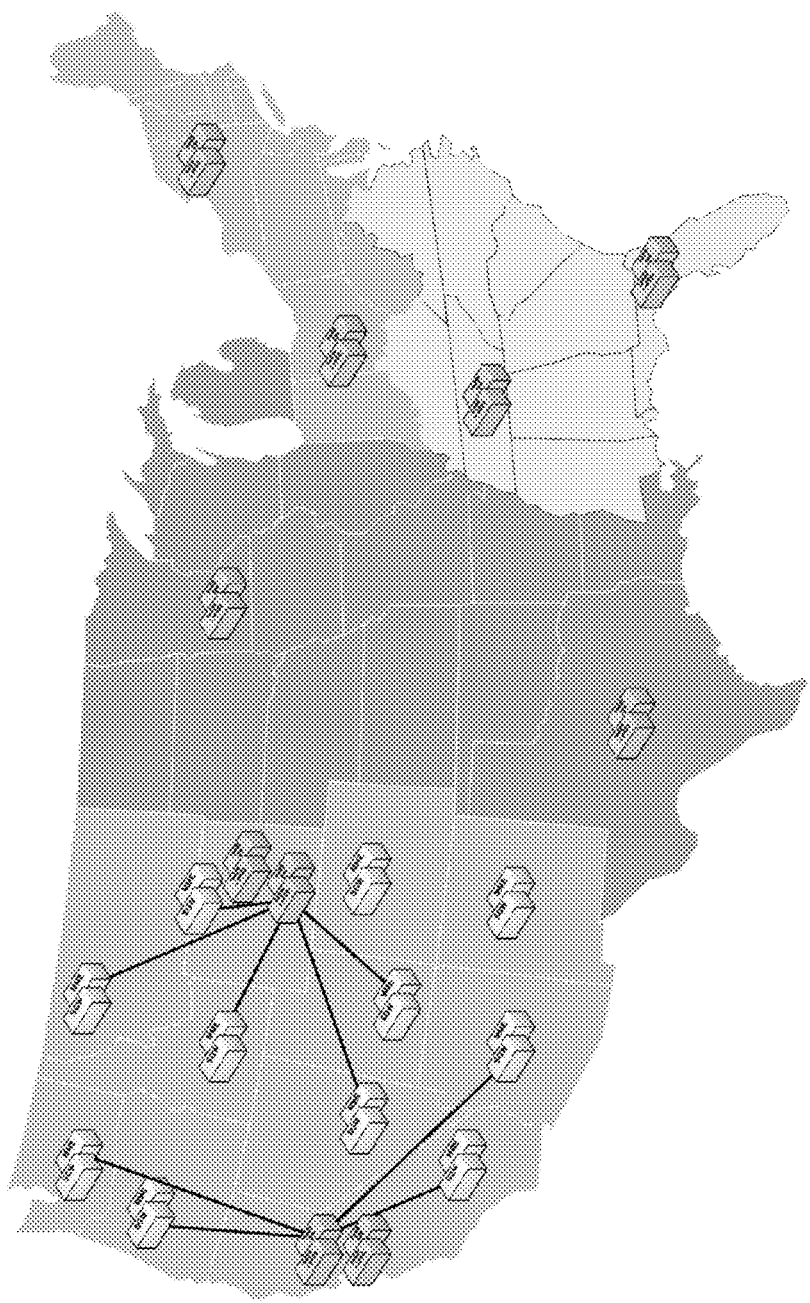
FIG. 11 illustrates an example nationwide deployment of a macro communications network in accordance with certain embodiments.

FIG. 11 illustrates an example nationwide deployment of a macro communications network in accordance with certain embodiments.

As used herein, a "macro network" refers to a non-virtual LTE network that has been deployed in a service provider's network. Generally, physical network nodes such as SGW, MME, SeGW, ePDG, and eNodeBs are shared by all communities or tenants in a virtual evolved packet core (EPC) network. The physical network nodes such as eNodeBs (not shown) may be spread across the nation. That is, eNodeBs and other physical network nodes in the macro network are spread geographically across the country. The other physical network nodes may include security gateways (SeGW), serving gateways (SGW), and mobility management entities (MMEs).

Figure 12:
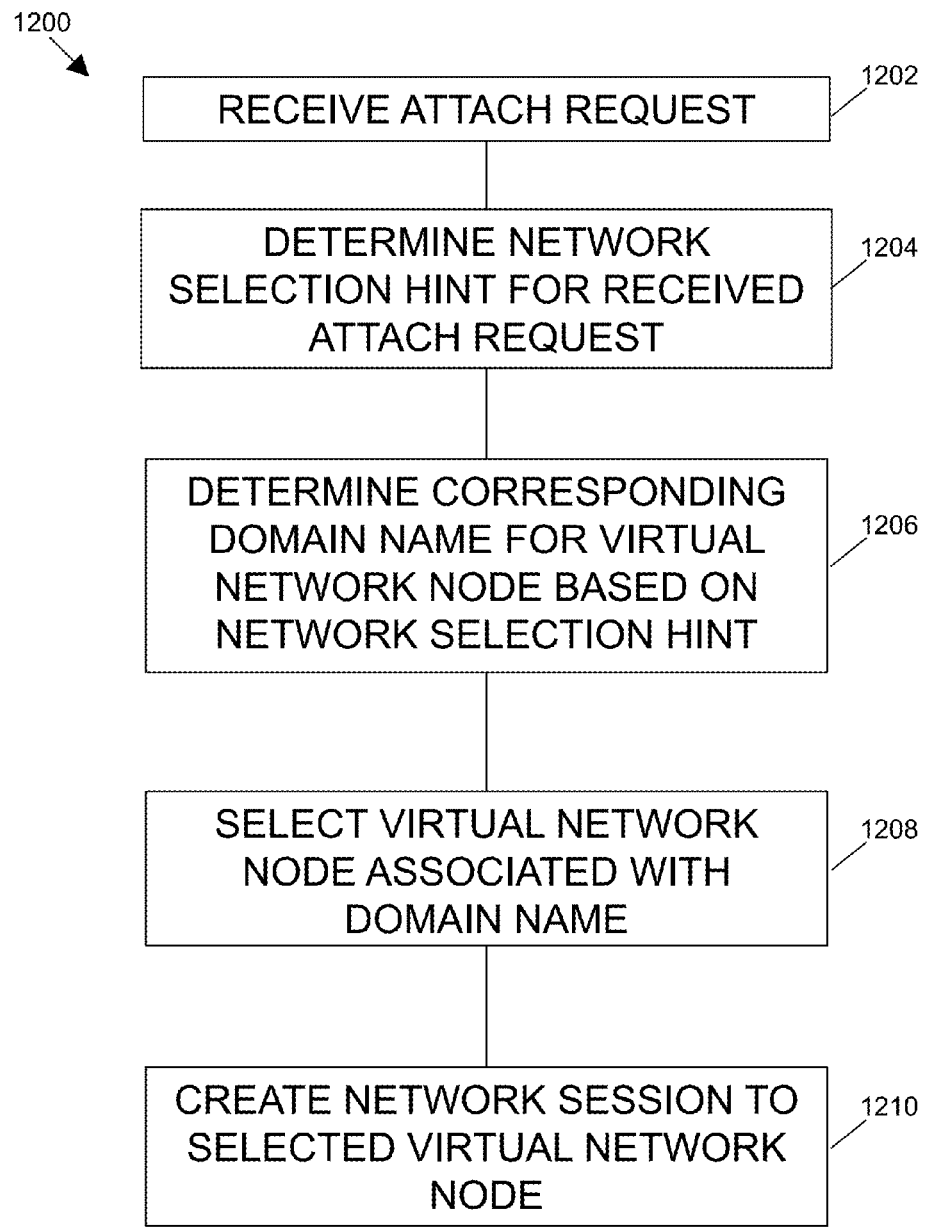
FIG. 12 illustrates a method for node selection in accordance with certain embodiments.

FIG. 12 illustrates a method 1200 for node selection in accordance with certain embodiments.

A gateway receives an attach request (step 1202). In some embodiments, the gateway may be a virtual mobility management entity (vMME) or an evolved Node B (eNodeB). In some embodiments, the attach request is received from an eNodeB as a result of an initial attach request or initial RRC Connection Request from a user equipment (UE).

The gateway determines a network selection hint for the received attach request (step 1204). In some embodiments, the network selection hint may be (1) a new attribute-value pair (AVP) in an Update-Location Answer (ULA) message in a home subscriber server (HSS), (2) subscription and domain name server (DNS) information, (3) a domain name for another related virtual network node, or a combination of (1), (2), or (3). The gateway may determine the network selection hint by searching for the existence of an appropriate attribute-value pair (AVP) in the ULA. The HSS provides user information to an MME using attribute-value pairs (AVP) in the ULA. The present methods can use a new AVP to store a domain name of a related virtual network node for the user device in the ULA. Furthermore, based on the contents of the new AVP, the present node selection systems are able to determine whether the vMME should select virtual network nodes or macro network nodes. The gateway may also determine the network selection hint using subscription and DNS information. For example, the gateway may extract service parameters of interest from subscription records for MCN Domains. Example service parameters may include an MIP6-Agent-Info parameter. The description below contains more information about how method 1200 uses the network selection hint.

The gateway determines a corresponding domain name for a virtual network node based on the network selection hint (step 1206). For example, the gateway may determine a fully-qualified domain name (FQDN) corresponding to the virtual network node. The gateway selects the virtual network node associated with the corresponding domain name (step 1208). In some embodiments, the selected virtual network node may be a virtual session gateway (vSGW) and/or a virtual packet data network gateway (vPGW). The gateway establishes a network session with the selected virtual network node (step 1210). The network session may be an LTE session.

vSGW Selection Based on New AVP in ULA from HSS

In some embodiments, the network selection hint includes a new attribute-value pair (AVP) added into home subscriber server (HSS) messaging received by a mobility management entity (MME). In some embodiments, the HSS messaging may include an Update-Location Answer (ULA) message. In particular, the present node selection mechanisms can include adding a new AVP to the subscription data in the user's profile in the HSS. The network selection hint can have a specific structure, such as "vsgw.<company>.mcn.<carrier>.net." "Mcn" in the network selection hint indicates that the present systems are virtualized and using a Mobile Cloud Network (MCN), instead of performing node selection in the macro network. The network selection hint further indicates a relevant community, tenant, or enterprise, such as "company." Furthermore, the network selection hint indicates a relevant function of the virtual network node, such as "vsgw."

As described earlier, the gateway determines a domain name based on the network selection hint. For example, if the network selection hint relates to a vPGW, the gateway may determine a domain name for a related vSGW by replacing a "vpgw" portion of the domain name with "vsgw," for example using substring manipulations on the FQDN. Accordingly, the gateway resolves the domain name to the correct virtual network node such as a vSGW.

In some embodiments, the network selection hint and method 1200 may apply regionally. For example, the gateway or vMME may append a local regional area (e.g., "dallas," "boston") into the FQDN, and the DNS accordingly provides the desired local vSGW IP addresses.

vPGW Selection Based on New AVP in ULA from HSS

In some embodiments, the AVP in the ULA from the HSS provides the FQDN for the vPGW to be used for this user. An example AVP may include vpgw.<company>.mcn.<carrier>.net.

Method 1200 may also apply to selecting a virtual packet data network gateway (vPGW). Method 1200 may further include adding an attribute-value pair (AVP) into the ULA from the HSS. Method 1200 may further include modifying the vMME not to derive the relevant PGW according to traditional methods, but instead to use the new AVP. Traditionally, an MME uses DNS lookup-based functions to select traditional PGWs. Advantageously, storing a fully-qualified domain name (FQDN) in a new AVP allows a pool of virtual network nodes to be selected, and accordingly allows more direct control than with traditional methods.

In further embodiments, the network selection hint and method 1200 may apply regionally. For example, the gateway or vMME appends the local regional area into the FQDN, and the DNS accordingly provides the desired local vPGW IP addresses.

vSGW and vPGW Selection Using Subscription Info and DNS Info

In some embodiments, the network selection hint includes adding a service parameter to relevant network records. The network records may include Name Authority Pointer (NAPTR) records. For example, method 1200 can include adding parameters for "[M] Destination-Realm" and "[M] Destination-Host" to track corresponding domain names for desired virtual network nodes. For example, the domain names may be formatted as fully-qualified domain names to incorporate information for enterprises/large domains. Method 1200 further includes configuring the vMME not to perform SGW node selection based on eNodeB information, but rather to obtain vSGW information from subscription information of the UE from HSS as described earlier.

For example, in the present virtual evolved packet core (vEPC) network topology, an MCN Operator may provision Name Authority Pointer (NAPTR) records for MCN Domains for use within their network with the following "Service Parameters." The format of the Destination-Realm and Host can be defined as follows:

[M] MIP6-Agent-Info:
[M] MIP-Home-Agent-Host:
[M] Destination-Realm: mcn.mnc481.mcc311.3gppnetwork.org
[M] Destination-Host: acme.mcn.mnc481.mcc311.3gppnetwork.org In some embodiments, the vMME determines a corresponding domain name for the network selection hint as follows. The vMME extracts the fully-qualified domain name (FQDN) from the "MIP6 Agent Info" service parameter, and contracts an NAPTR query using the extracted destination host. DNS returns the respective service parameters "x-3gpp-pgw:x-s5-gtp" or "x-3gpp-sgw:x-s11." For an initial attach procedure, the vMME performs a DNS A/AAAA query with replacement string matching the service parameters of "x-3gpp-sgw:x-s11" and "x-3gpp-pgw:x-s5-gtp." The DNS query results in the desired IP addresses of the S11 interface of the SGW and the S5 interface of the PGW for the MCN Domain.

In some embodiments, DNS is configured such that the vSGW and vPGW are within the same MCN Container.

vSGW Selection Based on vPGW FQDN

The present node selection mechanisms allow a vMME to find vSGW information based on having the same host or realm. In further embodiments, the present node selection mechanisms allow a vMME to select a combined vSGW, or a specific vSGW for a set of communities.

In some embodiments, the ULA message from the HSS contains an attribute-value pair (AVP) called "MIP6-Agent-Info." The description for this AVP is that the MIP6-Agent-Info AVP is type Grouped and is defined in IETF RFC 5447, the entire contents of which are incorporated by reference herein. Traditionally this AVP contained the identity of the PGW. This AVP conveys the identity of the PGW between the MME and HSS, regardless of the specific mobility protocol used (e.g., general packet radio service (GPRS) tunneling protocol (GTP) or Proxy Mobile IPv6 (PMIPv6)).

Within the MIP6-Agent-Info grouped AVP, there is another AVP called "MIP-Home-Agent-Host." This AVP contains a FQDN of the PGW. This AVP is used to resolve the PGW IP address through the DNS function. The HSS supports provisioning of an FQDN for the PGW, for static allocation access point names (APNs).

In further embodiments, if the above AVPs are used to communicate a FQDN for the vPGW, then the PDN-GW-Allocation-Type is set to STATIC. 3GPP Technical Standard 29.272 describes the relevant AVP, the entire contents of which are hereby incorporated by reference. Regarding the AVP for PDN-GW-Allocation-Type, possible values may include STATIC (0) or DYNAMIC (1). This AVP is set to STATIC if the HSS allocates the included MIP6-Agent-Info. This AVP is set to DYNAMIC if the MME performs PGW allocation. If the MME sends a NOR for an APN where the PGW was allocated by the MME, the HSS includes the MIP6-Agent-Info from that Notify Request (NOR) in subsequent APN-Configuration attributes if the allocation type is DYNAMIC.

In some embodiments, determining the corresponding domain name may include creating a domain name for a vSGW based on the domain name of the vPGW based on the AVPs described above and their usage.

Figure 13:
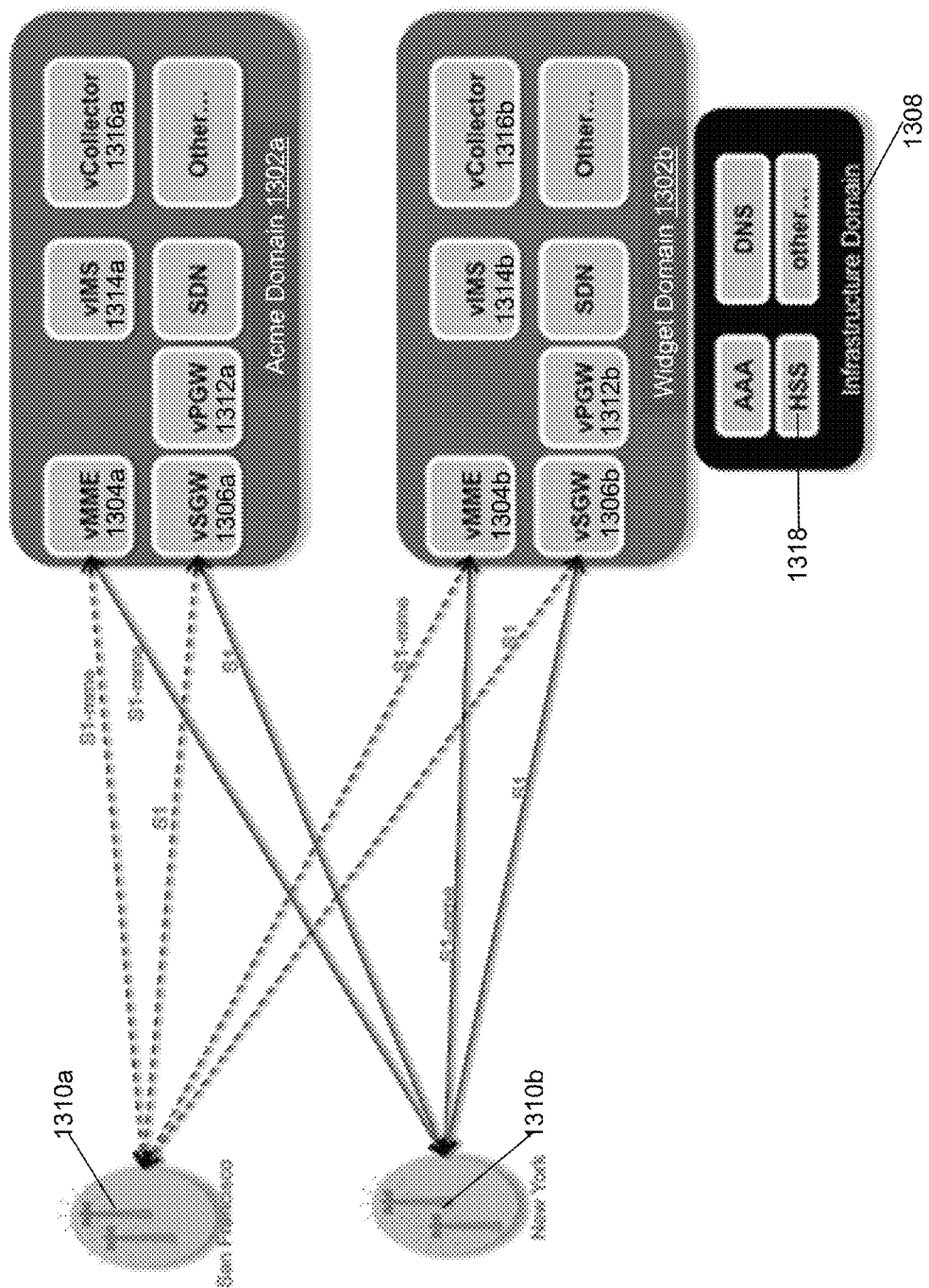
FIGS. 13-16 illustrate node selection among virtual evolved packet core (EPC) resources in accordance with certain embodiments.

FIG. 13 illustrates node selection among virtual evolved packet core (EPC) resources in accordance with certain embodiments. FIG. 13 includes eNodeBs 1310a-1310b in communication with MCN Domains 1302a-1302b, and Infrastructure Domain 1308.

MCN Domain 1302a may be used by a first community, such as ACME. MCN Domain 1302b may be used by a second community, such as WIDGET. MCN Domains 1302a-1302b include MCN Containers (not shown). The MCN Containers may be in different MCN PODs or in the same MCN POD. The illustrated "overlay" vEPC network may be its own container in a data center.

In some embodiments, the present node selection architecture allows eNodeBs 1310a in San Francisco to select directly virtual network nodes such as vMME 1304a or vMME 1304b, or vSGW 1304a or vSGW 1304b, regardless of regional or geographic location. Other virtual network nodes that can be selected include vPGW 1312a-1312b, vIMS 1314a-1314b, and vCollector 1316a-1316b. In other embodiments, the present node selection can be indirect, illustrated in FIGS. 14-16 and accompanying description. After node selection completes, eNodeBs 1310a in San Francisco are able to communicate with the selected virtual nodes. For example, eNodeBs 1310a may communicate with vMME 1304a or vMME 1304b over an S1-mme interface, or with vSGW 1306a or vSGW 1306b over an S1 interface. Similarly, eNodeBs 1310b in New York may perform the present node selection methods to select virtual network nodes such as vMME 1304a or vMME 1304b, or vSGW 1306a or vSGW 1306b, independent of regional or geographic location of vMME 1304a or vMME 1304b. Similarly, the regional or geographic location of any data centers housing MCN Containers corresponding to ACME Domain 1302a or WIDGET Domain 1302b does not need to be used for the present node selection systems and methods.

Advantageously, the present node selection methods accommodate architectural and operational differences between traditional core networks and the mobile cloud network (MCN) described earlier. Traditional node selection mechanisms do not address the needs of the vEPC environment.

The virtual evolved packet core (vEPC) environment has various architectural and operational needs, as described following. The present node selection systems and methods can address these operational needs, including (1) multi-tenancy to support multiple communities, and (2) centralized deployment.

Multi-Tenancy

The vEPC network architecture is designed to support multiple communities or tenants of interest. For example, a typical description of virtual service elements in the vEPC network may be "An ACME container in the BOSTON Data Center POD contains three PGWs, two SGWs and one MME." This description provides all necessary information regarding where virtual resources are for a tenant or community and what those virtual resources are.

Relatedly, the present multi-tenancy architecture also supports allocating vEPC resources specifically per community or per tenant. For example, ACME may have its own vEPC resources and WIDGET may have its own vEPC resources.

Centralized Deployment

The present multi-tenancy architecture further illustrates that vEPC resources may also be more centralized and managed in a centralized fashion. In contrast, traditional node selection managed EPC resources in a regionalized and geographical fashion. Accordingly, regional or geographical tracking area identity (TAI)-based node selection such as for selecting session gateways (SGW) is not appropriate for the present systems and methods. Furthermore, vPGWs in MCN PODs may also support communities or tenants.

Advantageously, MCN PODs may be located in data centers around the nation. Accordingly, physical resources for tenants or communities are deployed in data centers or anywhere there are MCN PODs. The present deployment model is different than the traditional regional deployment model present used for the macro network.

As described earlier, physical network nodes such as eNodeBs may be shared by all tenants or communities, and the eNodeBs may be generally spread across the nation. Accordingly, the present node selection methods account for the fact that the eNodeBs and their locations are not relevant to where a corresponding vMME, vSGW, or vPGW is located for a particular LTE session.

The present node selection methods may have one or more advantages. The number of stream control transmission protocol (SCTP) connections from physical eNodeBs can substantially smaller than in the traditional model. Moreover, service providers traditionally maintain large numbers of eNodeBs, up to tens of thousands. Advantageously, each time a new tenant or community is added, the cell site does not have to be configured for communication with that community's or tenant's MME pool. Furthermore, the present node selection methods allow a device in the vEPC Domain to differentiate between community sessions destined for the virtual EPC network (e.g., ACME and WIDGET sessions), and sessions destined for the macro network. The present node selection methods also allow EPC functions differentiate between community sessions (e.g., sessions for an ACME customer versus a WIDGET customer). Furthermore, the present node selection methods allow a service provider to charge or account for LTE resources for a specific community or tenant in mobile cloud networks.

Figure 14:
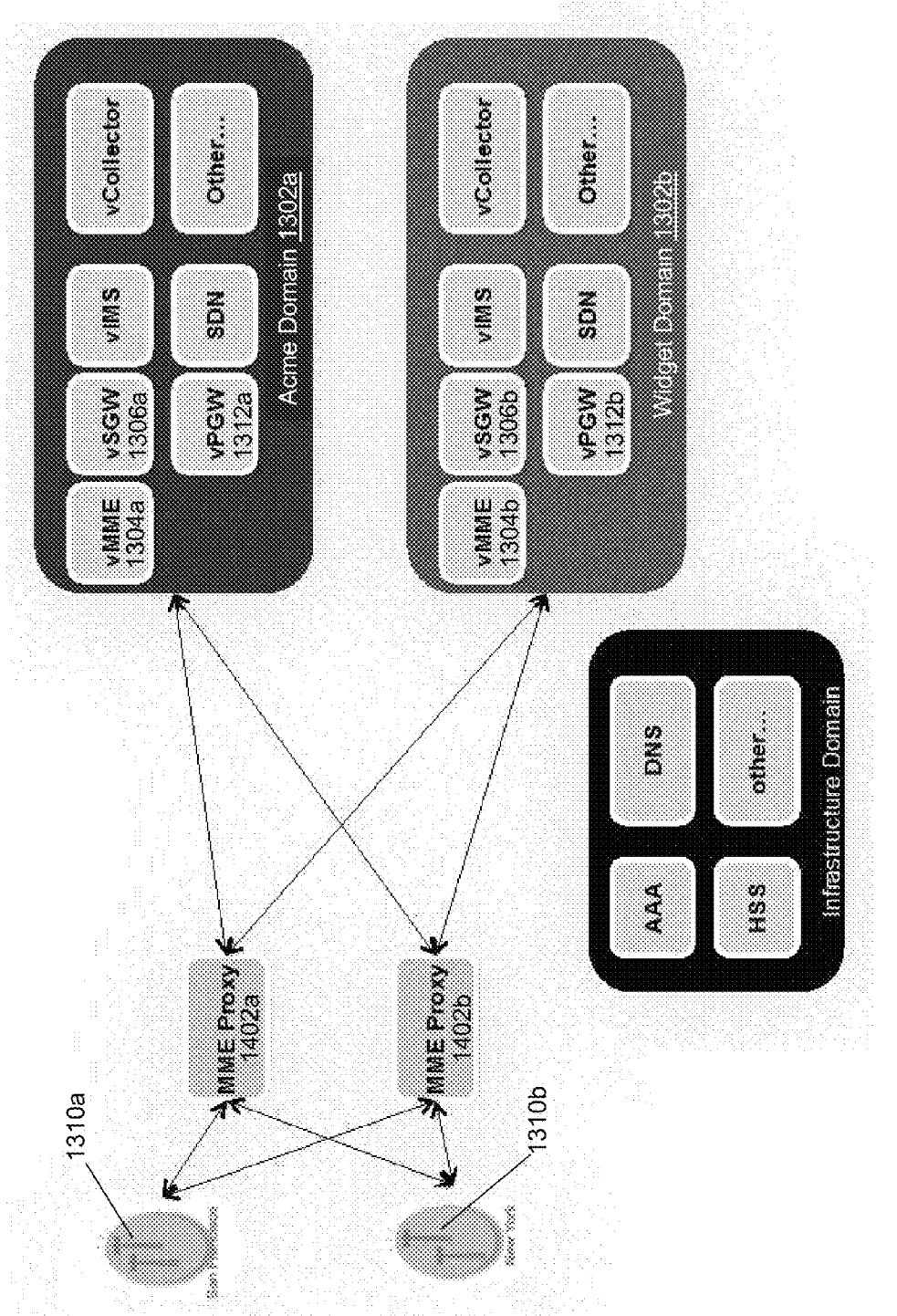
Figure 15:
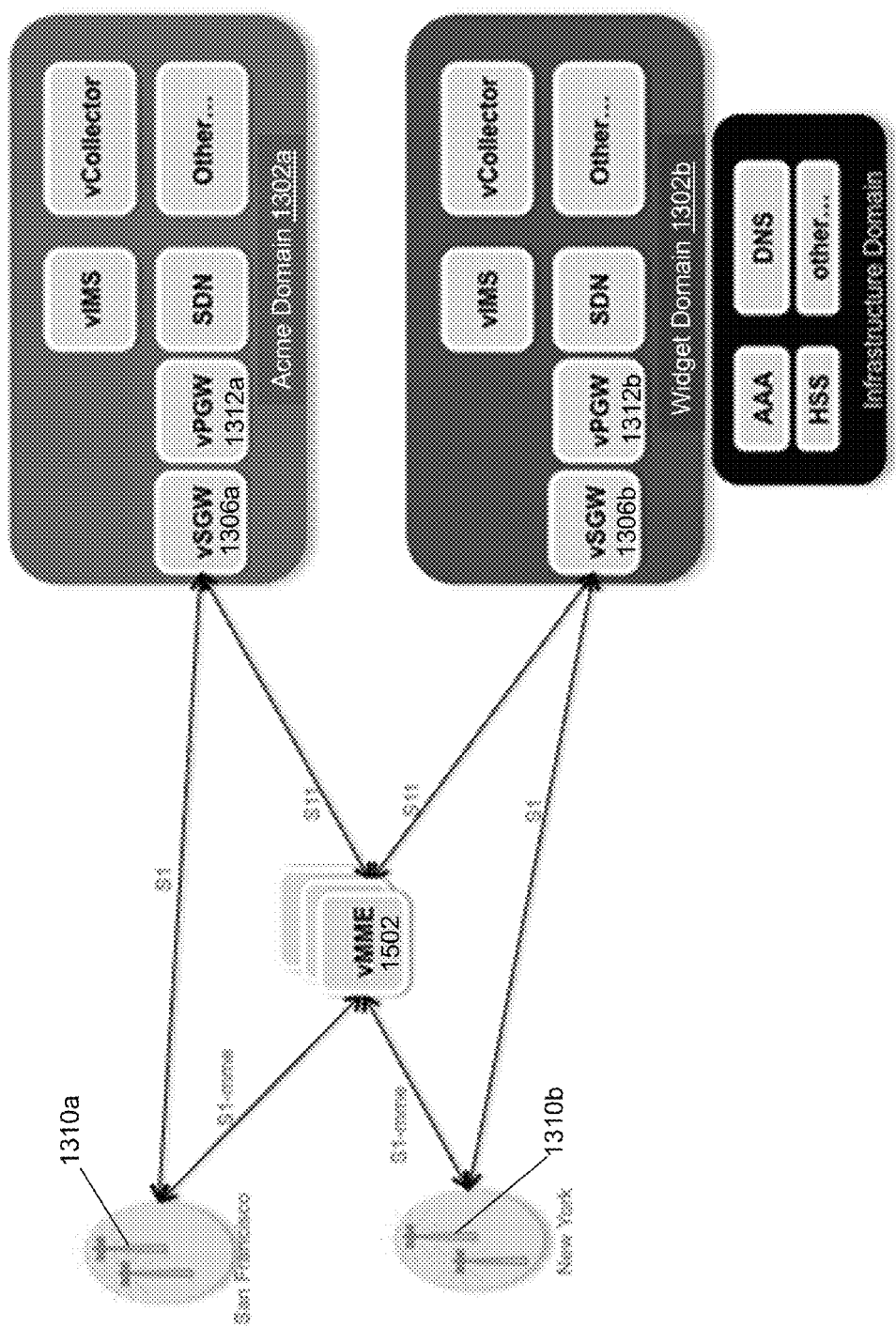
Figure 16:
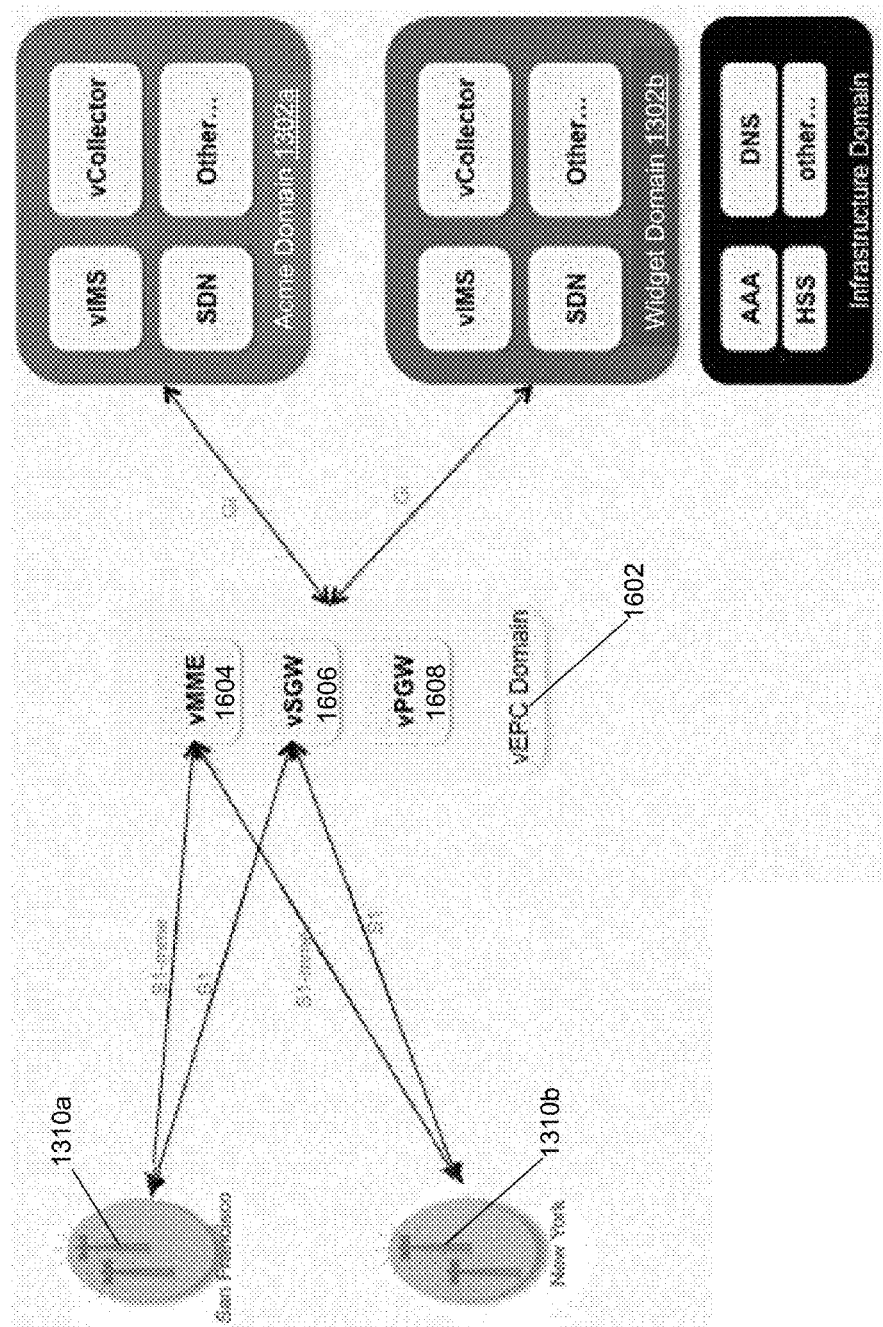

FIGS. 14-16 describe further potential deployment models for the vEPC network.

FIG. 14 illustrates node selection using centralized or shared virtual mobility management entity (vMME proxy) in accordance with certain embodiments. FIG. 14 includes eNodeBs 1310a-1310b in communication with MME Proxies 1402a-1402b. MME Proxies 1402a-1402b are in communication with MCN Domains 1302a-1302b.

Similar to FIG. 13, MCN Domain 1302a may be used by an ACME community, and MCN Domain 1302b may be used by a WIDGET community. MCN Domains 1202a-1202b include MCN Containers (not shown). The MCN Containers may be in different MCN PODs or in the same MCN POD. The illustrated "overlay" vEPC network may be its own container in a data center.

In some embodiments, the present node selection architecture allows MME Proxies 1402a-1402b in San Francisco to select virtual network nodes. The selected virtual network nodes may include vMME 1304a or vMME 1304b, and vSGW 1306a or vSGW 1306b, regardless of regional or geographic location. Other virtual network nodes that may be selected include vPGW 1312a-1312b, vIMS 1314a-1314b, and vCollector 1316a-1316b. For example, eNodeB 1310a may use the present node selection methods to select a virtual network node such as MME Proxy 1402a or MME Proxy 1402b. MME Proxies 1402a-1402b may act as intermediaries for handling LTE session requests from eNodeBs 1310a-1310b. That is, MME Proxies 1402a-1402b may further use the present node selection methods themselves, to select an MCN Domain 1302a-1302b and virtual nodes in MCN Domains 1302a-1302b for handling the LTE session.

After node selection completes, eNodeBs 1310a in San Francisco are able to communicate with the selected virtual nodes. The regional or geographic location of any data centers housing MCN Containers corresponding to ACME Domain 1302a or WIDGET Domain 1302b does not need to be used for the present node selection systems and methods.

FIG. 15 illustrates node selection using centralized or shared virtual mobility management entities (vMMEs) or vMME clusters in accordance with certain embodiments. FIG. 15 includes eNodeBs 1310a-1310b in communication with virtual mobility management entity (vMME) cluster 1502, and in communication with MCN Domains 1302a-1302b.

FIG. 15 illustrates a similar virtual evolved packet core (EPC) network topology to FIGS. 13 and 14. The present virtual EPC network topology includes eNodeBs 1310a-1310b in communication with vMME cluster 1502 and with MCN Domains 1302a-1302b. vMME cluster 1502 may contain one or more vMMEs. vMME cluster 1502 may be shared among communities or tenants, while virtual network nodes vPGWs and vSGWs 1306a-1306b remain specific per community or per tenant. MCN Domains 1302a-1302b do not illustrate a vMME node contained within the MCN Domain. To eNodeBs 1310a-1310b, the present systems present vMME cluster 1502 as a physical mobility management entity (MME). Although FIG. 15 and the accompanying description includes a "vMME cluster," eNodeBs 1310a-1310b treat vMME cluster 1502 as a standards-based standalone MME. Similarly, from the perspective of any vMME in vMME cluster 1502, the vMMEs treat vMME cluster 1502 as a standalone eNodeB.

In some embodiments, the present virtual EPC network applies the present node selection methods as follows. vMME cluster 1502 may perform the present node selection methods, with the result being that vMME cluster 1502 may select virtual network nodes such as vSGWs 1306a-1306b in either MCN Domain 1302a representing an ACME Domain, or MCN Domain 1302b representing a WIDGET Domain. eNodeB 1310a may also perform the present node selection methods, the result being that eNodeB 1310a may select either vMME cluster 1502 over an S1-mme interface, or a virtual network node such as vSGW 1306a in MCN Domain 1302a over an S1 interface. Similarly, the result of eNodeB 1310b performing the present node selection methods eNodeB 1310a may select either vMME cluster 1502 over an S1-mme interface, or a virtual network node such as vSGW 1206b in MCN Domain 1302b over an S1 interface.

In some embodiments, the present node selection mechanisms include the following aspects. As described earlier in connection with FIG. 11, eNodeBs 1310a-1310b may be in the macro network and accordingly spread geographically across the country. The present node selection mechanisms may introduce a new public land mobile network identifier (PLMN-ID) such as VEPC_PLMNID to indicate that a network node supports the virtual evolved packet core (EPC) network. The eNodeBs may be configured to broadcast the new PLMN-ID in addition to the traditional PLMN-ID. In further embodiments, an eNodeB is able to broadcast a maximum of six PLMN IDs.

To make use of the new PLMN-ID, eNodeBs configured according to the present systems and methods may be configured to setup a stream control transmission protocol (SCTP) connection to centralized vMME cluster 1502 based on configuration. For example, vMME cluster 1402 advertises to eNodeBs 1310a-1310b that vMME cluster 1502 supports the network selection hint "VEPC_PLMNID." As described earlier, vMME cluster 1502 is treated as a common resource for all MCN communities or tenants, while vSGWs 1306a-1306b and vPGWs 1312a-1312b are specific to customers. When an evolved packet system (EPS) domain user device connects, the device is also configured to use the PLMN-ID "VEPC_PLMNID." Depending on which eNodeB was connected to by the user device, eNodeB 1310a or eNodeB 1310b selects the configured vMME function for the S1-MME interface and NAS transport based on the network selection hint, e.g. PLMN-ID. Advantageously, using the PLMN-ID "VEPC_PLMNID" allows an eNodeB in the present systems to separate easily user devices associated with MCN Domains from user devices associated with the macro network. Furthermore, the present node selection methods are able to leverage existing eNodeB logic that searches for a PLMN-ID and sends calls to an appropriate MME pool.

FIG. 16 illustrates node selection among centralized or shared virtual evolved packet core (EPC) resources in accordance with certain embodiments. FIG. 16 includes eNodeBs 1310a-1310b, virtual evolved packet core (vEPC) Domain 1602, and MCN Domains 1402a-1402b.

FIG. 16 illustrates a similar virtual evolved packet core (EPC) network topology to FIGS. 14 and 15. The present virtual EPC network topology includes eNodeBs 1310a-1310b in communication with vEPC Domain 1602. vEPC Domain 1602 includes vMME 1604, vSGW 1606, and vPGW 1608. vEPC Domain 1602 is in communication with MCN Domains 1302a-1302b. vEPC Domain 1602 may be shared among communities or tenants, while virtual network nodes vIMS and vCollector remain specific per community or per tenant. Accordingly, MCN Domains 1302a-1302b do not illustrate vMMEs, vSGWs, or vPGWs contained within the MCN Domain.

Advantageously, the present node selection mechanisms allow certain traditional LTE mobility scenarios to be removed from a virtual evolved packet core (vEPC) network model because the mobility scenarios are no longer needed. The following scenarios are not needed in the vEPC scenario for mobile cloud network (MCN). Inter-MME transfer scenarios, inter-SGW transfer scenarios, and inter-PGW transfer scenarios are no longer needed. Because the present vEPC network models support virtual MMEs, much of traditional MME relocation may no longer be needed, unless an EPS Domain is represented using two or more MCN PODs. Non-3GPP connections such as eHRPD may no longer be needed, including non-3GPP Untrusted connections such as WiFi with ePDG.

Table 1 illustrates example embodiments of identities and PLMN-IDs for use in the present node selection methods.

TABLE 1

| Identities | Example |
| --- | --- |
| MSISDN | 1234567xxxx |
| Service Provider IMSI | 123456aaaaabbbb |
| MCN IMSI | 12345Xaaaaabbbb |

Mobile Subscriber Integrated Services Digital Network-Numbers (MSISDNs) such as MSISDN 1234567xxxx represent unique assignments or identifiers of LTE subscribers. Service Provider international mobile subscriber identity (IMSI) represents a primary ISMI assigned to an LTE subscriber that acts as a primary private ID for the subscriber.

In some embodiments, for LTE networks, this IMSI uses a mobile country code (MCC) of 123 and mobile network code (MNC) of 456. Specifically, traditionally PLMN-ID 123456 may represent traditional UE IMSIs in the macro packet core.

For user devices attaching to MCN Domains, the PLMN-ID used in the present node selection mechanisms may be a second PLMN-ID that is not otherwise in use by the macro network. Advantageously, using a second PLMN-ID provides an ability to separate mobile traffic and control access to MCN Domain user devices.

Table 2 illustrates example embodiments of public land mobile networks (PLMNs) used for a service provider or carrier.

TABLE 2

| MCC | MNC |
| --- | --- |
| 123 | 456 |
| 123 | 45x |

In some embodiments, the PLMN-ID may be derived from an existing identifier such as an existing PLMN-ID. For example, the PLMN-ID in the macro network may use a mobile country code (MCC) of 123 and a mobile network code (MNC) of 456. The PLMN-ID used for the present node selection methods may be derived from this identifier. For example, the PLMN-ID may use the same MCC of 123, with a MNC of 45x, representing that the present systems and methods use a secondary PLMN for the mobile cloud network (MCN).

Figure 17:
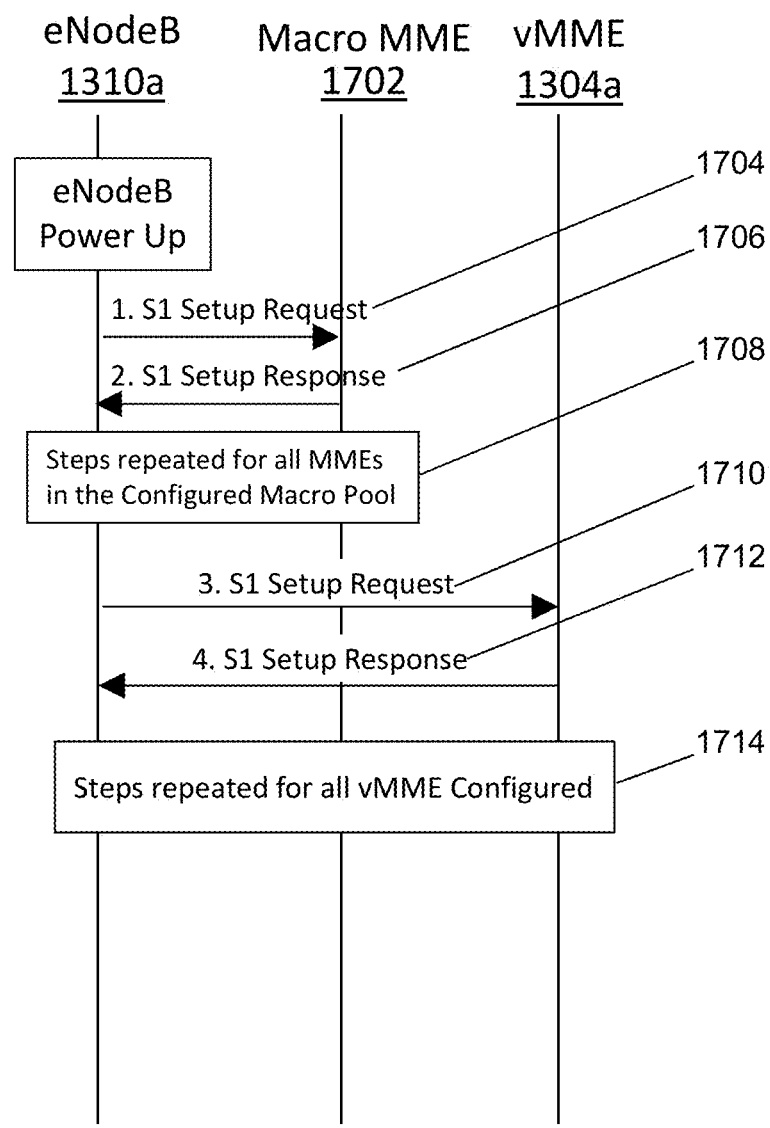
FIGS. 17-18 illustrate example call flows for node selection in accordance with certain embodiments.

FIG. 17 illustrates example call flows for node selection in accordance with certain embodiments. FIG. 17 includes eNodeB 1310a, macro mobility management entity (MME) pool 1702, and virtual MME 1304a.

FIG. 17 illustrates eNodeB 1310a performing power up and S1 setup. In some embodiments, eNodeB 1310a is pre-configured with MME pools to which it shall connect. As described earlier, in the present systems eNodeB 1310a views vMME 1304a or the vMME cluster as an actual MME. Accordingly, although the description following refers to a "vMME Cluster," in some embodiments eNodeB 1310a treats the vMME cluster as a traditional standards-based MME. Similarly, vMME 1304a views the vMME Cluster as a traditional eNodeB.

First, eNodeB 1310a sends an S1 Setup Request to Macro MME 1702 (step 1704). In some embodiments, the S1 Setup Request message is as follows: "S1 Setup Request (Message Type, Global eNodeB ID, [eNodeB Name], Supported TAs (TAC, Broadcast PLMNs (PLMN ID)), Default Paging DRX)." As described earlier in connection with FIG. 16, for example the PLMN-ID List sent in the S1 Setup Request message indicates availability of the macro network and the mobile cloud network, e.g. using PLMN-IDs 123456 and 12345x. These PLMN-IDs indicate to the present systems that mobile cloud network (MCN) virtual network nodes are available for user devices attaching to eNodeB 1310a.

Next, Macro MME 1702 sends an S1 Setup Response to eNodeB 1310a (step 1706). In some embodiments, the S1 Setup Response message is as follows: "S1 Setup Response (Message Type, [MME Name], Served GUMMEIs (Served PLMNs (PLMN ID), Served Group IDs (MME Group ID), Served MMECs (MME Code)), Relative MME Capacity, [Criticality Diagnostics])." The S1 Setup Response message also includes a PLMN ID List, however, the PLMN ID List includes the PLMN-ID of the macro network only, e.g. 123456.

Next, eNodeB 1310a repeats steps 1704, 1706 for every MME configured (step 1708). All MMEs in the Macro MME Pool use the same MME Group ID.

Next, eNodeB 1310 sends an S1 Setup Request to vMME 1304a (step 1710). As described earlier, in some embodiments vMME 1304a may be a vMME proxy or a vMME cluster, rather than a standalone vMME. The S1 Setup Request message includes: "S1 Setup Request (Message Type, Global eNodeB ID, [eNodeB Name], Supported TAs (TAC, Broadcast PLMNs (PLMN ID)), Default Paging DRX)." In some embodiments, the PLMN ID List indicates availability of the macro network and the mobile cloud network, e.g. using PLMN-IDs 311480 and 31148x.

Lastly, vMME 1304a sends an S1 Setup Response message to eNodeB 1310a (step 1712). In some embodiments, the S1 Setup Response message includes: "S1 Setup Response (Message Type, [MME Name], Served GUMMEIs (Served PLMNs (PLMN ID), Served Group IDs (MME Group ID), Served MMECs (MME Code)), Relative MME Capacity, [Criticality Diagnostics])." In further embodiments, the PLMN ID List indicates availability of the mobile cloud network (MCN), 31148x. As described earlier, advantageously, eNodeB 1310a is unaware of the role of vMME 1304a in the network. Instead, eNodeB 1310a considers vMME 1204a to be similar to a traditional MME.

Finally, eNodeB 1310a repeats steps 1710, 1712 for every MME configured (step 1714). In some embodiments, all vMME Proxies in a Pool use the same MME Group ID.

Figure 18:
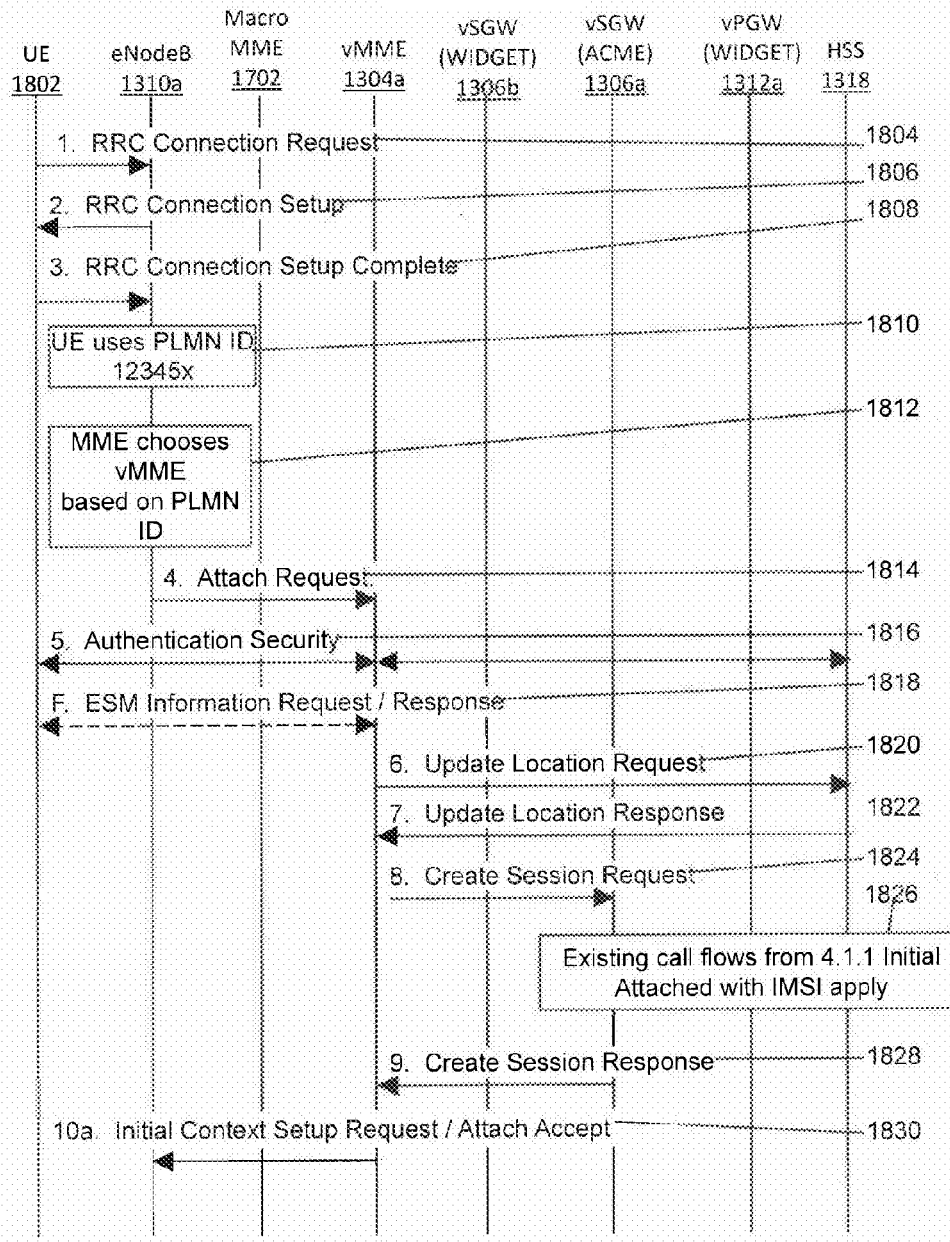

FIG. 18 illustrates call flows for node selection in accordance with certain embodiments. FIG. 18 illustrates an International Mobile Subscriber Identity (IMSI) Attach for Low Priority User Equipment (UE). FIG. 18 illustrates communications with a UE 1802, an eNodeB 1310a, a macro MME pool 1702, a virtual MME (vMME) 1304a or vMME cluster or vMME pool, vSGWs 1306a-1306b, vPGW 1312a, and HSS 1318. As illustrated, the present call flow assumes the secondary PLMN ID drives the present node selection mechanisms and other messages.

As with FIG. 17, the present description occasionally refers to a vMME cluster. As described earlier, the vMME cluster (not shown) appears to eNodeB 1310a as a traditional MME, and to vMME 1304a as a traditional eNodeB. Details of an attach procedure, such as an E-UTRAN Initial Attach procedure, are described in 3GPP Technical Standard 23.401. Modifications to the traditional attach procedure are described as follows.

User Equipment (UE) 1802 first sends a Radio Resource Control (RRC) Connection Request message to eNodeB 1310a (step 1804). eNodeB 1310a sends an RRC Connection Setup message to UE 1802 (step 1806). UE 1802 sends an RRC Connection Setup Complete message to eNodeB 1310a (step 1808). In some embodiments, in the RRC Connection Setup Complete message, UE 1802 chooses the 12345x PLMN assigned for Machine Type Connection (MTC) devices (step 1810). As described earlier, PLMN-ID 12345x indicates that a resulting communication session for UE 1802 should be established in the virtual evolved packet core (EPC) network. An MME in Macro MME Pool 1702 selects a virtual MME (vMME) based on the retrieved PLMN-ID (step 1812).

eNodeB 1310a sends an Attach Request message to the vMME proxy (shown as vMME 1304a) (step 1814). In some embodiments, eNodeB 1310a selects a vMME, vMME cluster, or vMME proxy based on the retrieved PLMN ID, and sends the Attach Request message as part of its Initial UE Message. Specifically, the Initial UE Message may include "Initial UE Message (Message Type, eNodeB UE SLAP ID, NAS-PDU, TAI, ECGI, RRC Establishment cause, CSG ID, [Cell Access mode], GW Transport Layer Address))." The non-access-stratum protocol data unit (NAS PDU) includes the Attach Request message described earlier. The Attach Request message includes the PDN Connectivity Request message in the ESM Container. Accordingly, vMME 1304a makes use of the information elements (IEs) in the Attach Request and PDN Connectivity Request messages when sending Create Session Request messages and to setup appropriate bearers.

UE 1802 next exchanges Authentication Security (step 1816) and ESM Information Request and Response (step 1818) messages with vMME 1304a. As described earlier, vMME 1304a sends an Update-Location Request to HSS 1318 (step 1820). HSS 1318 sends an Update-Location Response or Update-Location Answer (ULA) to vMME 1304a (step 1822). As described earlier, in some embodiments, the ULA may contain a network selection hint such as an added attribute-value pair (AVP) designating mobile cloud networks (MCN) to which UE 1802 is allowed access. In some embodiments, messages between an attaching vMME and a vMME Proxy or vMME Cluster are mapped with an appropriate eNodeB UE S1AP ID.

vMME 1304a performs the present node selection methods, and selects a virtual network node. For example, vMME 1304a selects vSGW 1306a corresponding to the ACME domain and not vSGW 1306b corresponding to the WID- GET domain. Accordingly, vMME 1304a sends a Create Session Request message to vSGW 1306a for ACME (step 1824).

Traditional call flows for Initial Attach with IMSI are performed (step 1826).

vSGW 1306a sends a Create Session Response message to vMME 1304a (step 1828). vMME 1304a sends to the vMME Proxy (shown as eNodeB 1310a) an Initial Context Setup Request message (step 1830). vMME 1304a further sends to eNodeB 1310a an Attach Accept message for UE 1802. The Attach Accept message is sent as a NAS PDU in the Initial Context Setup Request message, which includes: "Initial Context Setup Request (Message Type, MME UE S1AP ID, eNodeB UE S1AP ID, UE-AMBR, E-RAB to be Setup List [E-RAB ID, E-RAB Level QoS parameters, Transport Layer Address, GTP TEID, NAS-PDU], UE Security Capabilities, Security key). In some embodiments, the MME Code in the globally unique temporary ID (GUTI) is the MME Code of vMME 1304a. Specifically, the Attach Accept message from vMME 1304a for UE 1802 includes "Attach Accept (Protocol Discriminator, Security Header type, Attach accept message identity, EPS attach result, Spare half octet, T3412 value (GPRS timer), TAI list, ESM message container [Activate Default EPS Bearer Context Request], EPS mobile identity (GUTI), T3402 value, T3412 extended value)." In some embodiments, the Activate Default EPS Bearer Context Request message has the following information elements (IEs): (Protocol Discriminator, EPS bearer identity, Procedure transaction identity, Activate Default EPS Bearer Context Request message identity, EPS QoS, APN and PDN Address).

EXAMPLES

Below are some example scenarios which describe various aspects of the present node selection mechanisms. In some embodiments, the PGW-Allocation-Type attribute-value pair (AVP) is set to STATIC for the various scenarios.

Example 1

Community has One MCN Container

As described earlier, an MCN Container represents a grouping of virtual network elements for a particular community. Example 1 assumes a user device belongs to only one community.

Example 1 describes a network topology as follows:
Number of Containers for the ACME community (tenant): 1
Location of ACME Container: Dallas MCN POD
Number of vSGWs in the ACME container in DALLAS POD: 2
IP Address of vSGW1 in ACME Container in DALLAS POD: 192.168.1.1
IP Address of vSGW2 in ACME Container in DALLAS POD: 192.168.1.2
Number of vPGWs in the ACME Container in DALLAS POD: 2
IP Address of vPGW1 in ACME Container in DALLAS POD: 192.168.2.1
IP Address of vPGW2 in ACME Container in DALLAS POD: 192.168.2.2

As described earlier, MIP-Home-Agent-Host is an example result of provisioning. Generally, the vMME resolves information such as a domain name for the vPGW, and determines a corresponding domain name based on the vPGW domain name. For example, the vMME determines corresponding vSGW information and resolves a domain name for the vSGW. The present node selection results in control of the desired vSGW in the desired community and location.

In some embodiments, the present node selection proceeds as follows in the vMME and HSS. The HSS is provisioned with the following values:
PDN-GW-Allocation-Type: STATIC (0)
MIP-Home-Agent-Host: vpgw.acme.mcn.<carrier>.net A user device belonging to the ACME community attaches to the LTE network. The MME determines a network selection hint corresponding to the attach request. For example, the MME sends an Update-Location Request (ULR) to the HSS. The HSS responds with an Update-Location Response or Update-Location Answer (ULA) having the following values:
PDN-GW-Allocation-Type: STATIC (0)
MIP-Home-Agent-Host: vpgw.acme.mcn.<carrier>.net The network selection hint may be the MIP-Home-Agent-Host, whose value corresponds to a domain name for a vPGW, vpgw.acme.mcn.<carrier>.net. The MME resolves the fully-qualified domain name (FQDN) "vpgw.acme.mcn.<carrier>.net" using a domain name service (DNS). DNS returns the following IP addresses for the vPGW:
192.168.2.1
192.168.2.2

The MME determines a corresponding domain name for a desired virtual network node, based on the network selection hint. For example, the MME creates a corresponding vSGW fully-qualified domain name (FQDN) based on the vPGW FQDN. An example vSGW domain name may be "vsgw.acme.mcn.<carrier>.net." The MME resolves the vSGW FQDN "vsgw.acme.mcn.<carrier>.net" using DNS. DNS returns the following IP addresses for the vSGW:
192.168.1.1
192.168.1.2

The MME is able to proceed to select the vSGW associated with the domain name, and create an LTE session to the selected vSGW in the ACME container in Dallas.

Example 2

Community has Multiple MCN Containers

Example 2 includes multiple MCN containers, where either MCN container may be selected. That is, the community, tenant, or enterprise is not concerned with which vPGW and vSGW are used from a location perspective for the attaching end user. Accordingly, the present node selection systems and methods select a vPGW and vSGW, and DNS provides corresponding information for both locations. The present systems allow load-balancing using the multiple MCN containers, and result in choosing a single MCN container.

Example 2 includes the following network topology:
Number of MCN Containers for the ACME community (tenant): 2
Location of ACME Containers: Dallas MCN POD, Boston MCN POD
Number of vSGWs in the ACME container in DALLAS POD: 2
IP Address of vSGW1 in ACME Container in DALLAS POD: 192.168.1.1
IP Address of vSGW2 in ACME Container in DALLAS POD: 192.168.1.2

Number of vSGWs in the ACME container in BOSTON POD: 2
IP Address of vSGW1 in ACME Container in BOSTON POD: 192.168.10.1
IP Address of vSGW2 in ACME Container in BOSTON POD: 192.168.10.2
Number of vPGWs in the ACME Container in DALLAS POD: 2
IP Address of vPGW1 in ACME Container in DALLAS POD: 192.168.2.1
IP Address of vPGW2 in ACME Container in DALLAS POD: 192.168.2.2
Number of vPGWs in the ACME Container in BOSTON POD: 2
IP Address of vPGW1 in ACME Container in BOSTON POD: 192.168.20.1
IP Address of vPGW2 in ACME Container in BOSTON POD: 192.168.20.2

The present node selection methods proceed as follows. The HSS is provisioned with the following values:
PDN-GW-Allocation-Type: STATIC (0)
MIP-Home-Agent-Host: vpgw.acme.mcn.<carrier>.net A user device belonging to the ACME community attaches to the cellular network. The MME sends an Update-Location Request to the HSS. The HSS responds with an Update-Location Response or Update-Location Answer (ULA) having the following values:
PDN-GW-Allocation-Type: STATIC (0)
MIP-Home-Agent-Host: vpgw.acme.mcn.<carrier>.net The MME determines a network selection hint corresponding to the received attach request. For example, the MME uses the MIP-Home-Agent-Host received from the HSS. Here, the virtual network host information in MIP-Home-Agent-Host AVP has no location (i.e., no reference to Dallas or Boston). As described earlier, the MME uses DNS to resolve the fully-qualified domain name (FQDN) for the vPGW, "vpgw.acme.mcn.<carrier>.net." DNS returns the following IP addresses for the vPGW, corresponding to vPGWs in Dallas and Boston locations:
192.168.2.1
192.168.2.2
192.168.20.1
192.168.20.2

The MME determines a corresponding domain name for the desired virtual network node based on the network selection hint. For example, MME creates the vSGW FQDN based on the vPGW FQDN to be "vsgw.acme.mcn.<carrier>.net." The MME resolves the FQDN "vsgw.acme.mcn.<carrier>.net" with DNS. DNS returns the following IP addresses for the vSGW, corresponding to vSGWs in Dallas and Boston locations:
192.168.1.1
192.168.1.2
192.168.10.1
192.168.10.2

As described earlier, in other embodiments the ULA from HSS includes the vSGW FQDN. Accordingly, the MME determines a corresponding domain name for the desired virtual network node by extracting the vSGW FQDN from the ULA and using the vSGW FQDN as an indicator of the vSGW to be selected.

The MME proceeds to select a desired vSGW and vPGW, and create a corresponding LTE session for the user device in the ACME container, where the location of Dallas or Boston does not matter for the community.

Example 3

Community has Multiple MCN Containers and End User is Steered to a Location

Example 3 describes a scenario in which the community or enterprise has a desired location for the LTE session with the user device. However, Example 3 assumes the community is not concerned with which PGW and SGW is used for this end user from a location perspective.

Example 3 includes the following network topology:
Number of Containers for the ACME community (tenant): 2
Location of ACME Containers: Dallas MCN POD, BOSTON MCN POD
Number of vSGWs in the ACME container in DALLAS POD: 2
IP Address of vSGW1 in ACME Container in DALLAS POD: 192.168.1.1
IP Address of vSGW2 in ACME Container in DALLAS POD: 192.168.1.2
Number of vSGWs in the ACME container in BOSTON POD: 2
IP Address of vSGW1 in ACME Container in BOSTON POD: 192.168.10.1
IP Address of vSGW2 in ACME Container in BOSTON POD: 192.168.10.2
Number of vPGWs in the ACME Container in DALLAS POD: 2
IP Address of vPGW1 in ACME Container in DALLAS POD: 192.168.2.1
IP Address of vPGW2 in ACME Container in DALLAS POD: 192.168.2.2
Number of vPGWs in the ACME Container in BOSTON POD: 2
IP Address of vPGW1 in ACME Container in BOSTON POD: 192.168.20.1
IP Address of vPGW2 in ACME Container in BOSTON POD: 192.168.20.2

The present node selection methods proceed as follows. The HSS is provisioned with the following values:
PDN-GW-Allocation-Type: STATIC (0)
MIP-Home-Agent-Host:
    vpgw.acme.dallas.mcn.<carrier>.net A user device belonging to the ACME community attaches to the LTE network. The vMME sends an Update-Location Request to the HSS. The HSS responds using an Update-Location Response or Update-Location Answer (ULA) having the following values:
PDN-GW-Allocation-Type: STATIC (0)
MIP-Home-Agent-Host:
    vpgw.acme.dallas.mcn.<carrier>.net The vMME determines a network selection hint corresponding to the received attach request. For example, the vMME uses the value of the MIP-Home-Agent-Host received from the HSS. The MIP-Home-Agent-Host includes a value relating to the desired location, such as "dallas." The vMME uses DNS to resolve the fully-qualified domain name (FQDN) "vpgw.acme.dallas.mcn.<carrier>.net" corresponding to the vPGW. DNS returns the following IP addresses for the vPGW:
192.168.2.1
192.168.2.2

The vMME determines a corresponding domain name to select the virtual network node based on the network selection hint. For example, the MME creates a fully-qualified domain name (FQDN) corresponding to the desired vSGW, based on the vPGW FQDN. An example vSGW FQDN may include "vsgw.acme.dallas.mcn.<carrier>.net."

The vMME resolves the determined FQDN "vsgw.acme.dallas.mcn.<carrier>.net" using DNS. DNS returns the following IP addresses for the vSGW:

192.168.1.1
192.168.1.2

The vMME is able to proceed to select virtual network nodes associated with the determined domain name, and establish an LTE session with the selected vSGW and vPGW in the ACME MCN Container in Dallas.

In some embodiments, the present node selection mechanisms support establishing network sessions with virtual network nodes in different locations. For example, the present node selection methods allow establishing a network connection with a vPGW in Dallas and with a SGW in Boston. The present node selection systems and methods allow explicit selection of desired virtual network nodes and data centers for the network connection.

The present node selection mechanisms support regional node selection if the need exists. In some embodiments, the MME pool appends the local area in to the FQDN and DNS provides the local vSGW IP addresses.

vMME Behavior after Initial Node Selection

During the present initial node selection process, the vMME Cluster selects a vSGW for the user device. In some embodiments, for subsequent packet data network (PDN) connectivity requests, i.e. after an initial attach, the vMME performs a DNS A/AAAA query or performs the other mechanisms described above for vPGW selection. Advantageously, the result is that the same vSGW may be maintained for the end user.

User Equipment and Gateway

The user equipment described above can communicate with a plurality of radio access networks using a plurality of access technologies and with wired communication networks. The user equipment can be a smart phone offering advanced capabilities such as word processing, web browsing, gaming, e-book capabilities, an operating system, and a full keyboard. The user equipment may run an operating system such as Symbian OS, Apple iOS, Blackberry OS, Windows Mobile, Linux, Palm WebOS, and Google Android. The screen may be a touch screen that can be used to input data to the mobile device and the screen can be used instead of the full keyboard. The user equipment may have the capability to run applications or communicate with applications that are provided by servers in the communication network. The user equipment can receive updates and other information from these applications on the network.

The user equipment also encompasses many other devices such as televisions (TVs), video projectors, set-top boxes or set-top units, digital video recorders (DVR), computers, netbooks, laptops, and any other audio/visual equipment that can communicate with a network. The user equipment can also keep global positioning coordinates, profile information, or other location information in its stack or memory. The user equipment can have a memory such as a computer readable medium, flash memory, a magnetic disk drive, an optical drive, a programmable read-only memory (PROM), and/or a read-only memory (ROM). The user equipment can be configured with one or more processors that process instructions and run software that may be stored in memory. The processor can also communicate with the memory and interfaces to communicate with other devices. The processor can be any applicable processor such as a system-on-a-chip that combines a CPU, an application processor, and flash memory. The interfaces can be implemented in hardware or software. The interfaces can be used to receive both data and control information from the network as well as local sources, such as a remote control to a television. The user equipment can also provide a variety of user interfaces such as a keyboard, a touch screen, a trackball, a touch pad, and/or a mouse. The user equipment may also include speakers and a display device in some embodiments.

Figure 19:
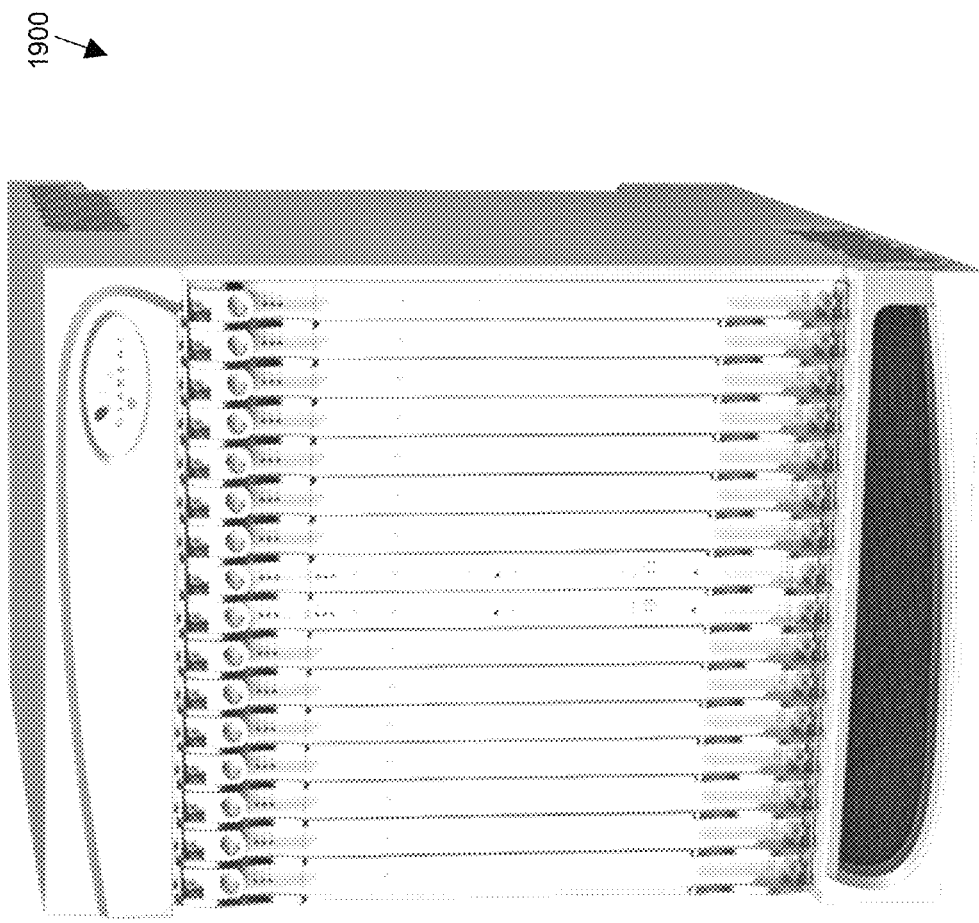
FIGS. 19-21 illustrate a network device for node selection in accordance with certain embodiments.

FIG. 19 illustrates a network device 1900 for node selection in accordance with certain embodiments. The node selection gateway described above is implemented in network device 1900 in some embodiments. Network device 1900 can implement multiple and different integrated functionalities. In some embodiments, one or more of the following functionalities can be implemented on network device 1900 including a security gateway (SeGW), an access gateway, a Gateway General packet radio service Serving Node (GGSN), a serving GPRS support node (SGSN), a packet data inter-working function (PDIF), an access service network gateway (ASNGW), a User Plane Entity (UPE), an IP Gateway, a session initiation protocol (SIP) server, a proxy-call session control function (P-CSCF), and an inter-rogating-call session control function (I-CSCF), a serving gateway (SGW), and a packet data network gateway (PDN GW), a mobility management entity (MME), a mobility access gateway (MAG), an HRPD serving gateway (HSGW), a local mobility anchor (LMA), a packet data serving node (PDSN), a foreign agent (FA), and/or home agent (HA).

In certain embodiments, the functionalities are provided by a combination of hardware and software in the network device. General purpose hardware can be configured in the network device to provide one or more of these specialized functionalities. The gateway can also support sessions originated from a Femto base station, which would connect to the gateway using a broadband network. A person or corporation may use a Femto base station in a home or business to support one or more mobile nodes. The gateway can provide trigger based traffic management during a handoff from a Femto base station to a macro base station, while maintain traffic management for the mobile node. The node selection gateway can be implemented as any combination of the following including an xGSN, an xGW, an xGW-SGW, and an xGW-PGW.

In some embodiments the network device is implemented using a collection of integrated circuit boards or cards. These cards include input/output interfaces for communication amongst each other, at least one processor for executing instructions and running modules that are stored in memory, and memory for storing data. The features of a network device that implements a gateway, in accordance with some embodiments, are further described below.

Figure 20:
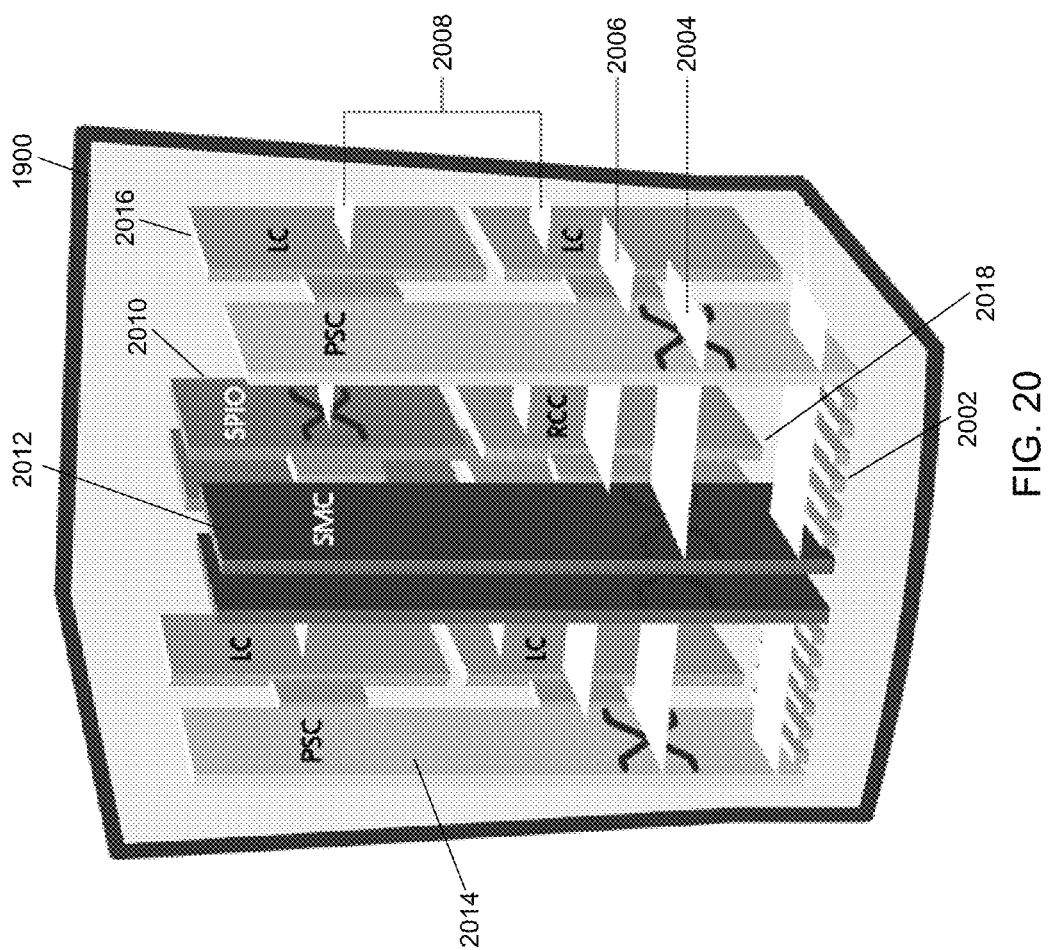

FIG. 20 illustrates the implementation of a network device 1900 in accordance with some embodiments. Network device 1900 includes slots 2002 for loading application cards and line cards. A midplane can be used in network device 1900 to provide intra-network device communications, power connections, and transport paths between the various installed cards. The midplane can include buses such as a switch fabric 2004, a control bus 2006, a system management bus, a redundancy bus 2008, and a time division multiplex (TDM) bus (not shown). The switch fabric 2004 is an IP-based transport path for user data throughout the network device implemented by establishing inter-card communications between application cards and line cards. The control bus 2006 interconnects the control and management processors within the network device. The network device management bus provides management of system functions such as supplying power, monitoring temperatures, board status, data path errors, card resets, and other failover features. The redundancy bus 2008 provides transportation of user data and redundancy links in the event of hardware failures. The TDM bus provides support for voice services on the system.

The network device supports at least four types of application cards: a switch processor I/O card (SPIO) 2010, a system management card (SMC) 2012, a packet service card (PSC) 2014, and a packet accelerator card (not shown). Other cards used in the network device include line cards 2016 and redundant crossbar cards (RCC) 2018. The line cards 2016, when loaded in the network device, provide input/output connectivity to the network and other devices, as well as redundancy connections. The line cards 2016 include interfaces to the network through Ethernet, Fiber Optic, and the other communication mediums. The redundant crossbar card (RCC) 2018 includes a non-blocking crossbar and connections to each of the cards in the network device. This allows a redundant connection to be made through the redundant crossbar card 2018 from any one card to any other card in the network device. The SPIO card 2010 serves as a controller of the network device and is responsible for such things as initializing the network device and loading software configurations onto other cards in the network device.

The system management card (SMC) 2012 and switch processor card (not shown) are system control and management cards for managing and controlling other cards in the network device. The packet accelerator card (PAC) and packet service card (PSC) 2014 provide packet processing, context processing capabilities, and forwarding capabilities among other things. The PAC and PSC 2014 perform packet-processing operations through the use of control processors and a network processing unit. The network processing unit determines packet processing requirements; receives and transmits user data frames to/from various physical interfaces; makes IP forwarding decisions; implements packet filtering, flow insertion, deletion, and modification; performs traffic management and traffic engineering; modifies/adds/strips packet headers; and manages line card ports and internal packet transportation. The control processors, also located on the packet accelerator card, provide packet-based user service processing.

The operating system software can be based on a Linux software kernel and run specific applications in the network device such as monitoring tasks and providing protocol stacks. The software allows network device resources to be allocated separately for control and data paths. For example, certain packet accelerator cards and packet services cards can be dedicated to performing routing or security control functions, while other packet accelerator cards/packet services cards are dedicated to processing user session traffic. As network requirements change, hardware resources can be dynamically deployed to meet the requirements in some embodiments. The system can be virtualized to support multiple logical instances of services, such as technology functions (e.g., a SeGW PGW, SGW, MME, HSGW, PDSN, ASNGW, PDIF, HA, or GGSN).

The network device's software can be divided into a series of tasks that perform specific functions. These tasks communicate with each other as needed to share control and data information throughout the network device. A task is a software process that performs a specific function related to system control or session processing. Three types of tasks operate within the network device in some embodiments: critical tasks, controller tasks, and manager tasks. The critical tasks control functions that relate to the network device's ability to process calls such as network device initialization, error detection, and recovery tasks. The controller tasks mask the distributed nature of the software from the user and perform tasks such as monitor the state of subordinate manager(s), provide for intra-manager communication within the same subsystem, and enable inter-subsystem communication by communicating with controller(s) belonging to other subsystems. The manager tasks can control system resources and maintain logical mappings between system resources.

Individual tasks that run on processors in the application cards can be divided into subsystems. A subsystem is a software element that either performs a specific task or is a culmination of multiple other tasks. A single subsystem can include critical tasks, controller tasks, and manager tasks. Some of the subsystems that can run on a network device include a system initiation task subsystem, a high availability task subsystem, a recovery control task subsystem, a shared configuration task subsystem, a resource management subsystem, a virtual private network subsystem, a network processing unit subsystem, a card/slot/port subsystem, and a session subsystem.

The system initiation task subsystem is responsible for starting a set of initial tasks at system startup and providing individual tasks as needed. The high availability task subsystem works in conjunction with the recovery control task subsystem to maintain the operational state of the network device by monitoring the various software and hardware components of the network device. Recovery control task subsystem is responsible for executing a recovery action for failures that occur in the network device and receives recovery actions from the high availability task subsystem. Processing tasks are distributed into multiple instances running in parallel so if an unrecoverable software fault occurs, the entire processing capabilities for that task are not lost. User session processes can be sub-grouped into collections of sessions so that if a problem is encountered in one sub-group users in another sub-group will not be affected by that problem.

The architecture also allows check-pointing of processes, which is a mechanism to protect the system against any critical software processes that may fail. The self-healing attributes of the software architecture protects the system by anticipating failures and instantly spawning mirror processes locally or across card boundaries to continue the operation with little or no disruption of service. This unique architecture allows the system to perform at the highest level of resiliency and protects the user's data sessions while ensuring complete accounting data integrity.

Shared configuration task subsystem provides the network device with an ability to set, retrieve, and receive notification of network device configuration parameter changes and is responsible for storing configuration data for the applications running within the network device. A resource management subsystem is responsible for assigning resources (e.g., processor and memory capabilities) to tasks and for monitoring the task's use of the resources.

Virtual private network (VPN) subsystem manages the administrative and operational aspects of VPN-related entities in the network device, which include creating separate VPN contexts, starting IP services within a VPN context, managing IP pools and subscriber IP addresses, and distributing the IP flow information within a VPN context. In some embodiments, within the network device, IP operations are done within specific VPN contexts. The network processing unit subsystem is responsible for many of the functions listed above for the network processing unit. The card/slot/port subsystem is responsible for coordinating the events that occur relating to card activity such as discovery and configuration of ports on newly inserted cards and determining how line cards map to application cards.

The session subsystem is responsible for processing and monitoring a mobile subscriber's data flows in some embodiments. Session processing tasks for mobile data communications include: S1/S5/S8 interface termination for LTE networks, A 10/A11 interface termination for CDMA networks, GSM tunneling protocol (GTP) termination for GPRS and/or UMTS networks, asynchronous PPP processing, IPsec, packet filtering, packet scheduling, Diffserv codepoint marking, statistics gathering, IP forwarding, and AAA services, for example. Responsibility for each of these items can be distributed across subordinate tasks (called managers) to provide for more efficient processing and greater redundancy. A separate session controller task serves as an integrated control node to regulate and monitor the managers and to communicate with the other active subsystem. The session subsystem also manages specialized user data processing such as payload transformation, filtering, statistics collection, policing, and scheduling.

In providing emulation, as MIPv4 is received from a mobile node, the session subsystem can setup a MIPv4 termination and setup a PMIPv6 session towards the core network. A session manager can track the mapping of the sessions and processing to provide the emulation and interworking between the networks. A database can also be used to map information between the sessions, and store, for example, NAI, HoA, AE information in some embodiments.

The network device allows system resources to be allocated separately for control and data paths. For example, certain PACs/PSCs could be dedicated to performing routing or security control functions while other PACs/PSCs are dedicated to processing user session traffic. As network requirements grow and call models change, hardware resources can be added to accommodate processes, such as encryption, packet filtering, etc., that require more processing power.

Figure 21:
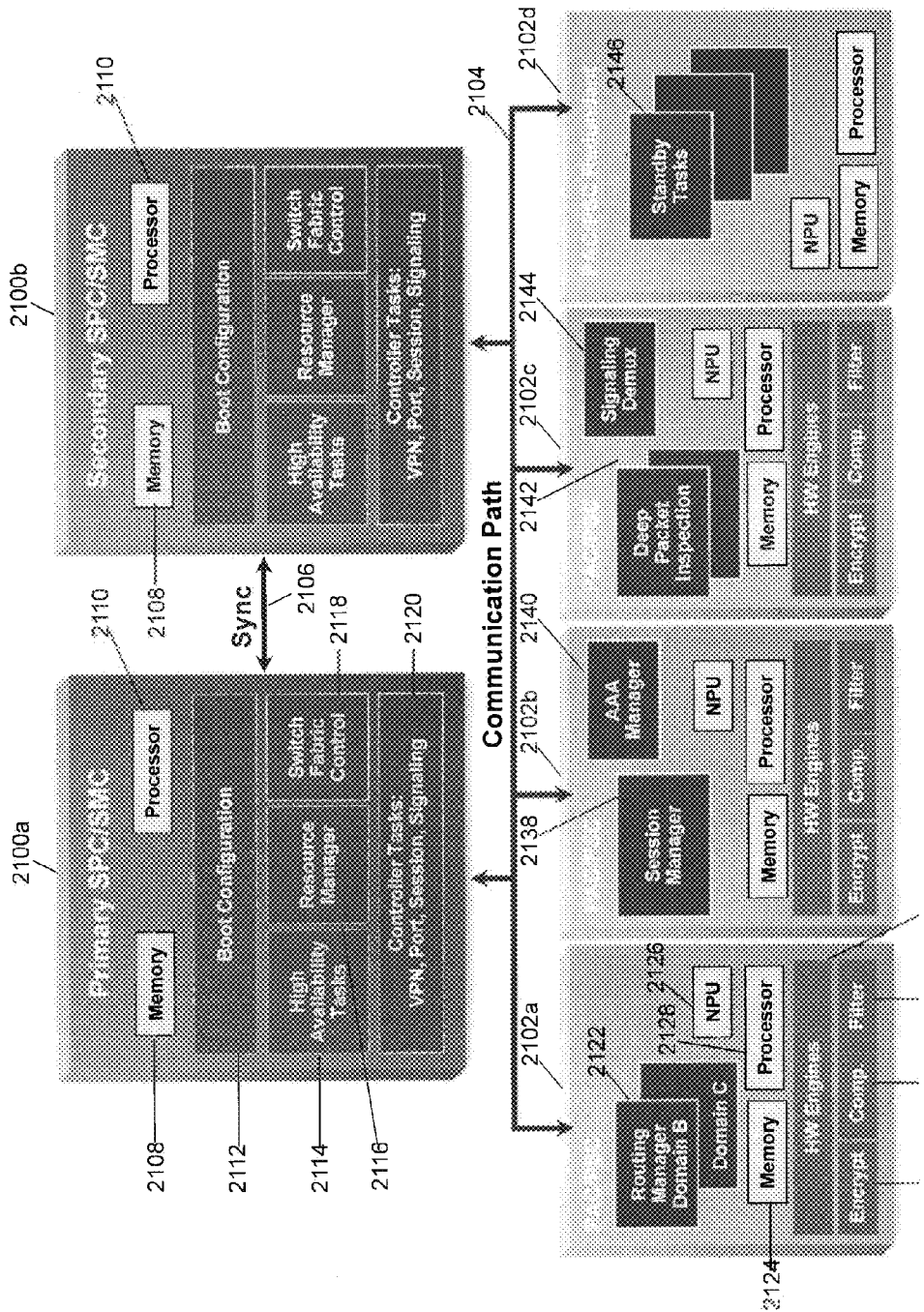

FIG. 21 illustrates a logical view of the software architecture of a network device in accordance with certain embodiments. As shown, the software and hardware can be distributed within the network device and across different circuit boards, processors, and memory. FIG. 21 includes a primary switch processor card (SPC)/system management card (SMC) 2100*a*, a secondary SPC/SMC 2100*b*, PAC/PSC 2102*a*-2102*d*, a communication path 2104, and a synchronization path 2106. The SPC/SMC 2100 include a memory 2108, a processor 2110, a boot configuration 2112, high availability tasks 2114, resource manager 2116, switch fabric control 2118, and controller tasks 2120.

The SPC/SMC 2100 manage and control the network device including the other cards in the network device. The SPC/SMC 2100 can be configured in a primary and secondary arrangement that provides redundancy and failsafe protection. The modules or tasks running on the SPC/SMC 2100 are related to network device wide control and management. The boot configuration task 2112 includes information for starting up and testing the network device. The network device can also be configured to startup in different configurations and providing different implementations. These can include which functionalities and services are capable of running on the SPC/SMC 2100. The high availability task 2114 maintains the operational state of the network device by monitoring the device and managing recovery efforts to avoid disruption of service. The resource manager tracks and assigns the available resources for sessions and demands on the network device. This can include load balancing among different processors and tasks running on the network device. Processes can be distributed across the system to fit the needs of the network model and specific process requirements. For example, most tasks can be configured to execute on SPC/SMC 2100 or a PAC/PSC 2102, while some processor intensive tasks can also be performed across multiple PACs/PSCs to utilize multiple CPU resources. Distribution of these tasks is invisible to the user. The switch fabric control 2118 controls the communication paths in the network device. The controller tasks module 2120 can manage the tasks among the resources of the networks to provide, for example, VPN services, assign ports, and create, delete, and modify sessions for user equipment.

The PAC/PSC 2102 are high-speed processing cards that are designed for packet processing and the tasks involved with providing various network functionalities on the network device. The PAC/PSC 2102 include a memory 2124, a network processing unit (NPU) 2126, a processor 2128, a hardware engine 2130, an encryption component 2132, a compression component 2134, and a filter component 2136. Hardware engines 2130 can be deployed with the card to support parallel distributed processing for compression, classification traffic scheduling, forwarding, packet filtering, and statistics compilations. The components can provide specialize processing that can be done more efficiently than using a general processor in some embodiments.

Each PAC/PSC 2102 is capable of supporting multiple contexts. The PAC/PSC 2102 are also capable of running a variety of tasks or modules. PAC/PSC 2102*a* provides routing managers 2122 with each covering routing of a different domain. PAC/PSC 2102*b* provides a session manager 2138 and an AAA manager 2140. The session manager 2138 manages one or more sessions that correspond to one or more user equipment. A session allows a user equipment to communicate with the network for voice calls and data. The AAA manager 2140 manages accounting, authentication, and authorization with an AAA server in the network. PAC/PSC 2102 provides a deep packet inspection task 2142 and a signaling demux 2144. The deep packet inspection task 2142 provides inspection of packet information beyond layer 4 for use and analysis by the network device. The signaling demux 2144 can provide scalability of services in combination with other modules. PAC/PSC 2102*d* provides redundancy through standby tasks 2146. Standby tasks 2146 store state information and other task information so that the standby task can immediately replace an active task if a card fails or if there is a scheduled event to remove a card.

In some embodiments, the software needed for implementing a process or a database includes a high level procedural or an object-orientated language such as C, C++, C#, Java, or Perl. The software may also be implemented in assembly language if desired. Packet processing implemented in a network device can include any processing determined by the context. For example, packet processing may involve high-level data link control (HDLC) framing, header compression, and/or encryption. In certain embodiments, the software is stored on a storage medium or device such as read-only memory (ROM), programmable-read-only memory (PROM), electrically erasable programmable-read-only memory (EEPROM), flash memory, or a magnetic disk that is readable by a general or special purpose-processing unit to perform the processes described in this document. The processors can include any microprocessor (single or multiple core), system on chip (SoC), microcontroller, digital signal processor (DSP), graphics processing unit (GPU), or any other integrated circuit capable of processing instructions such as an x86 microprocessor.

Although the present disclosure has been described and illustrated in the foregoing example embodiments, it is understood that the present disclosure has been made only by way of example, and that numerous changes in the details of implementation of the disclosure may be made without departing from the spirit and scope of the disclosure, which is limited only by the claims which follow. Other embodiments are within the following claims.

What is claimed is:

1. A gateway comprising:
a memory;
an interface; and
a processor coupled to the memory and the interface;
the gateway to:
receive a network selection hint from at least one of a home subscriber server (HSS) or a home location register (HLR);
determine that the network selection hint corresponds to an attach request for a user equipment (UE), the attach request received by the interface from an evolved Node B (eNodeB);
determine a domain name for establishing a network connection based at least in part on the network selection hint, wherein the determined domain name is associated with a virtual network node in a mobile cloud network;
provide the determined domain name to a domain name server (DNS);
receive, from the DNS, an address of the virtual network node associated with the determined domain name;
and
establish a network session to the virtual network node associated with the determined domain name.

2. The gateway of claim 1, wherein the network selection hint is contained in subscriber information received from the at least one of the home subscriber server (HSS) or the home location register (HLR).

3. The gateway of claim 2, wherein the network selection hint is an attribute-value pair (AVP) contained in an Update-Location Answer (ULA) from the at least one of the HSS or the HLR.

4. The gateway of claim 1,
wherein the network selection hint corresponds to a domain name of a related virtual network node, and
wherein the gateway is further to determine the domain name for the virtual network node based on the domain name of the related virtual network node.

5. The gateway of claim 1, wherein the gateway is at least one of a virtual mobility management entity (vMME), a vMME proxy, a vMME cluster, a virtual serving general packet radio service support node (vSGSN), a virtual evolved packet data gateway (vePDG), a virtual high-rate packet data serving gateway (vHSGW), or an eNodeB.

6. The gateway of claim 1, wherein the virtual network node is at least one of a virtual SGW (vSGW) or a virtual PGW (gPGW).

7. The gateway of claim 6, wherein the domain name is a fully-qualified domain name (FQDN) for the virtual SGW or virtual PGW.

8. The gateway of claim 1, wherein the gateway is further to determine whether the UE should select nodes in the mobile cloud network or in a macro network, based at least in part on the network selection hint.

9. The gateway of claim 1, wherein the network selection hint is contained in service parameters from subscription records for mobile cloud network domains.

10. The gateway of claim 9, wherein the network selection hint is stored in an MIP6-Agent-Info parameter.

11. A method comprising:
receiving, at a gateway from an evolved Node B (eNodeB), an attach request for a user equipment (UE);
receiving a network selection hint from at least one of a home subscriber server (HSS) or a home location register (HLR);
determining that the network selection hint corresponds to the received attach request;
determining a domain name for establishing a network connection based at least in part on the network selection hint, wherein the determined domain name is associated with a virtual network node in a mobile cloud network;
provide the determined domain name to a domain name server (DNS);
receive, from the DNS, an address of the virtual network node associated with the determined domain name; and
establishing a network session to the virtual network node associated with the determined domain name.

12. The method of claim 11, wherein the network selection hint is contained in subscriber information received from the at least one of the home subscriber server (HSS) or the home location register (HLR).

13. The method of claim 12, wherein the network selection hint is an attribute-value pair (AVP) contained in an Update-Location Answer (ULA) from the at least one of the HSS or the HLR.

14. The method of claim 11, wherein the network selection hint corresponds to a domain name of a related virtual network node, and wherein the determining the domain name further comprises determining the domain name for the virtual network node based on the domain name of the related virtual network node.

15. The method of claim 11, wherein the gateway is at least one of a virtual mobility management entity (vMME), a vMME proxy, a vMME cluster, a virtual serving general packet radio service support node (vSGSN), a virtual evolved packet data gateway (vePDG), a virtual high-rate packet data serving gateway (vHSGW), or an eNodeB.

16. The method of claim 11, wherein the selected virtual network node is at least one of a virtual SGW (vSGW) or a virtual PGW (gPGW).

17. The method of claim 16, wherein the domain name is a fully-qualified domain name (FQDN) for the virtual SGW or virtual PGW.

18. The method of claim 11, further comprising determining whether the UE should select nodes in the mobile cloud network or in a macro network, based at least in part on the network selection hint.

19. The method of claim 11, wherein the network selection hint is contained in service parameters from subscription records for mobile cloud network domains.

20. The method of claim 19, wherein the network selection hint is stored in an MIP6-Agent-Info parameter.

21. The method of claim 11, wherein the gateway is a mobility management entity (MME) or a virtual MME and the selected virtual network node is at least one of a virtual SGW (vSGW) or a virtual PGW (gPGW).

22. At least one non-transitory computer readable medium comprising logic that when executed is operable to:
receive, at a gateway from an evolved Node B (eNodeB), an attach request for a user equipment (UE);
receive a network selection hint from at least one of a home subscriber server (HSS) or a home location register (HLR);
determine that the network selection hint corresponds to the received attach request;
determine a domain name for establishing a network connection based at least in part on the network selection hint, wherein the determined domain name is associated with a virtual network node in a mobile cloud network;
provide the determined domain name to a domain name server (DNS);
receive, from the DNS, an address of the virtual network node associated with the determined domain name; and
establish a network session to the virtual network node associated with the determined domain name.

* * * * *